United States Patent
Kopikare et al.

(10) Patent No.: US 11,017,416 B2
(45) Date of Patent: May 25, 2021

(54) DISTRIBUTING ELECTRONIC SURVEYS TO PARTIES OF AN ELECTRONIC COMMUNICATION

(71) Applicant: QUALTRICS, LLC, Provo, UT (US)

(72) Inventors: Milind Kopikare, Draper, UT (US); Larry Dean Cheesman, Provo, UT (US)

(73) Assignee: Qualtrics, LLC, Provo, UT (US)

( * ) Notice: Subject to any disclaimer, the term of this patent is extended or adjusted under 35 U.S.C. 154(b) by 498 days.

(21) Appl. No.: 15/689,541

(22) Filed: Aug. 29, 2017

(65) Prior Publication Data

US 2018/0308113 A1 Oct. 25, 2018

Related U.S. Application Data

(60) Provisional application No. 62/488,551, filed on Apr. 21, 2017.

(51) Int. Cl.
*G06Q 30/02* (2012.01)
*G06Q 10/10* (2012.01)

(52) U.S. Cl.
CPC ....... *G06Q 30/0203* (2013.01); *G06Q 10/107* (2013.01); *G06Q 10/1095* (2013.01)

(58) Field of Classification Search
CPC ............ G06Q 10/107; G06Q 10/1095; G06Q 10/109; H04L 51/02; H04L 51/04; H04L 51/32; H04L 65/403
USPC ...................................................... 705/7.32
See application file for complete search history.

(56) References Cited

U.S. PATENT DOCUMENTS

| | | | | |
|---|---|---|---|---|
| 8,429,292 | B2 * | 4/2013 | Adams | H04M 1/72552 709/238 |
| 10,122,769 | B1 * | 11/2018 | Tuculescu | H04L 61/307 |
| 2003/0083962 | A1 * | 5/2003 | Araki | G06Q 20/20 705/26.1 |
| 2005/0197884 | A1 * | 9/2005 | Mullen, Jr. | G06Q 10/10 705/7.32 |
| 2007/0005715 | A1 * | 1/2007 | LeVasseur | H04L 63/145 709/206 |
| 2007/0124371 | A1 * | 5/2007 | Desai | G06Q 10/107 709/204 |
| 2014/0164525 | A1 * | 6/2014 | Malik | H04W 4/14 709/206 |
| 2015/0227592 | A1 * | 8/2015 | Govindaraju | G09B 7/00 707/722 |
| 2017/0206545 | A1 * | 7/2017 | Gupta | H04L 51/12 |

* cited by examiner

*Primary Examiner* — Renae Feacher
(74) *Attorney, Agent, or Firm* — Keller Jolley Preece

(57) ABSTRACT

In one or more embodiments, systems and methods allow a user to easily create an electronic survey by simply including a survey system as a party in a communication (e.g., an email address associated with a survey system being included in a meeting invite). In addition, the systems and methods provide for distributing the created electronic survey to a user based on the user being included as a party within the communication (e.g., an email address associated with the user being included in the meeting invite). Accordingly, the systems and methods create an electronic survey, and distribute the electronic survey to parties of a communication based on a user including a survey system as a party of the communication.

20 Claims, 22 Drawing Sheets

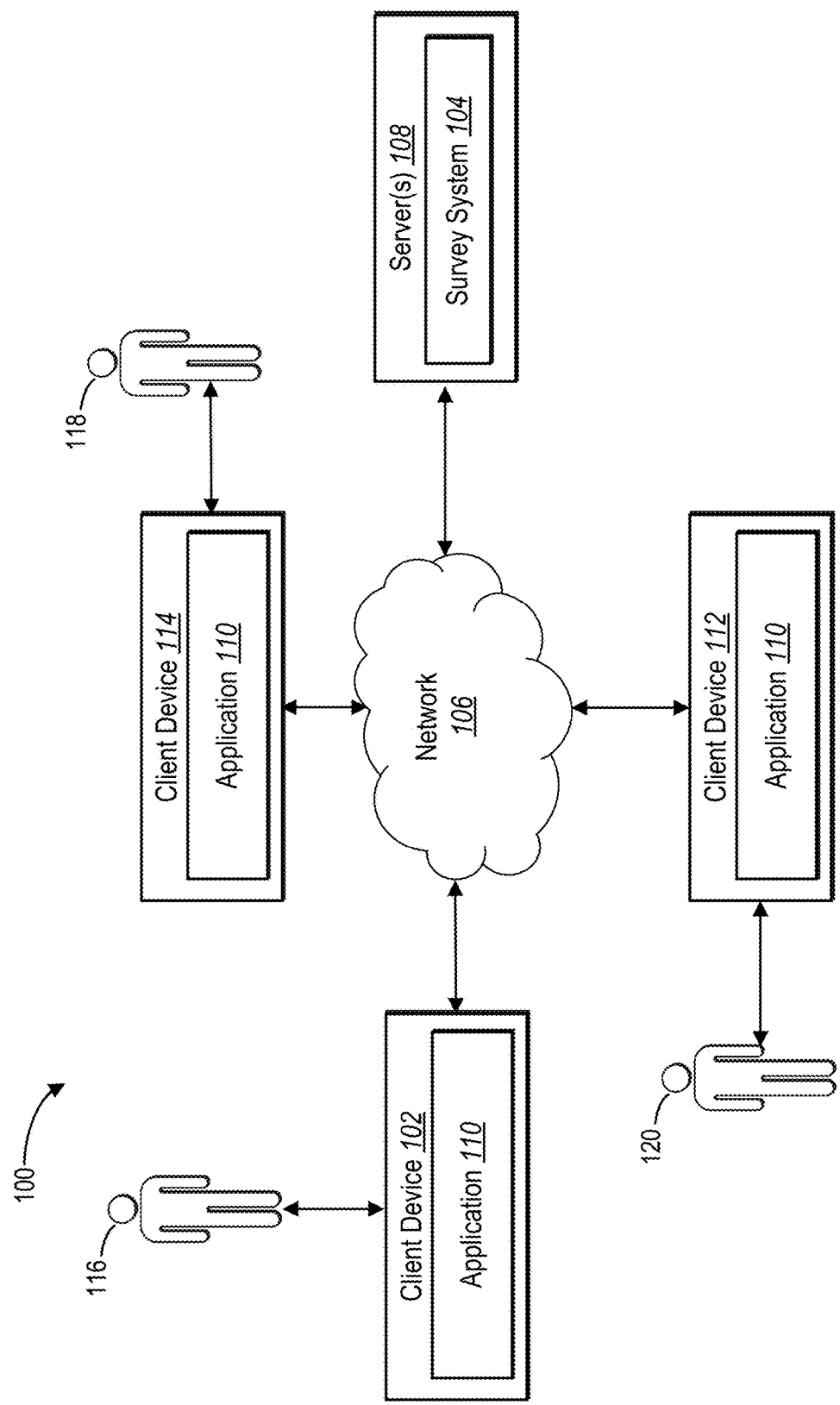

Fig. 6

*Fig. 7* qualtrics.com/survey/1f4hskvnwh4

How productive was the meeting?

1002

Not productive at all.
Wait - that was a meeting?

Kind of unproductive.
I mean, we talked about work.

Neutral. People probably got a lot of other work done during the meeting.

A little productive.
Left with some action items.

Very productive.
That was the best meeting ever!

*Fig. 10*

DISTRIBUTING ELECTRONIC SURVEYS TO PARTIES OF AN ELECTRONIC COMMUNICATION

CROSS REFERENCE TO RELATED APPLICATIONS

This application claims the benefit of priority to U.S. Provisional Patent Application No. 62/488,551, filed Apr. 21, 2017, and titled Distributing Electronic Surveys To Addressees Of An Electronic Communication, which is incorporated herein by reference in its entirety.

BACKGROUND

Developments in communication technology have led to the advent of electronic survey systems. To illustrate, a user can create an electronic survey online, and distribute the electronic survey to recipients via the Internet. The recipients can complete the electronic survey online to provide survey responses to the electronic survey system for reporting and analysis. Although the advent of electronic survey systems has resulted in significant advancements in electronic survey technology, conventional electronic survey systems suffer from a number of practical and technological limitations.

For example, in order to create and distribute an electronic survey, conventional systems often need a dedicated survey administrator (e.g., a user) to sign into the system, compose an electronic survey with questions and answers, input respondent information for users to whom the electronic survey is to be sent, and select and verify distribution channels for administering the electronic survey. While the conventional process of creating and distributing surveys is beneficial for advanced electronic surveys or large survey recipient pools, there are often cases where a user may want to create and distribute an electronic survey based on a certain event with a known set of respondents (e.g., team meeting, work presentation, or customer presentation). The electronic survey creation process of conventional systems, however, often imposes a time constraint and technological know-how barrier that causes a user to forgo creating the electronic survey. Accordingly, potentially valuable feedback and insightful information is lost due to the inefficiencies of creating an electronic survey in conventional systems.

As mentioned above, conventional systems have various technological limitations. For example, conventional systems often need a survey administrator to input a recipient list manually, by either inputting recipients individually (e.g., typing input) or by importing a recipient list. One cause of this technological limitation is the fact that most conventional systems have an isolated survey creation and input system, or in other words, conventional systems can only generate an electronic survey based on input a user provides directly within the electronic survey system itself. Therefore, the isolated nature of the electronic survey creation process within conventional systems forms a significant technological barrier for efficiently generating electronic surveys to administer to a defined group of recipients.

One reason conventional systems isolate the electronic survey creation process is due to security concerns. Indeed, conventional systems often provide an isolated electronic survey creation process to avoid the potential of outside or untrusted individuals generating and administering electronic surveys that would compromise a company's reputation, or corrupt the company's currently pending electronic surveys or survey response data. Conventional electronic survey systems use an isolated survey creation process to avoid security issues, but as a result, limit the ability for a user to efficiently create an electronic survey to distribute to a defined group of recipients.

Accordingly, these and other disadvantages exist with respect to conventional systems and methods for distributing electronic surveys.

SUMMARY

The various embodiments described below provide benefits and/or solve one or more of the foregoing or other problems in the art with systems, methods, and non-transitory computer readable mediums storing instructions (or simply "system") for creating an electronic survey and distributing the electronic survey in response to identifying an electronic communication and users associated with the electronic communication. In one or more embodiments, for example, a system creates an electronic survey in response to receiving an electronic communication based on a sender user including a survey system identifier (e.g., an email address associated with a survey system) as a party to the electronic communication. In addition, the system distributes the created electronic survey to a user based on the user being a party of the electronic communication, or in other words, based on the sender user of the electronic communication including an identifier of the user (e.g., an email address associated with the user) within the electronic communication. Accordingly, the system efficiently and securely creates an electronic survey to distribute to a defined group of users by way of an electronic communication external to the system.

Additional features and advantages of the embodiments will be set forth in the description that follows, and in part will be obvious from the description, or can be learned by the practice of such example embodiments. The features and advantages of such embodiments can be realized and obtained by means of the instruments and combinations particularly pointed out in the appended claims. These, and other features, will become more fully apparent from the following description and appended claims, or can be learned by the practice of such example embodiments as set forth hereinafter.

BRIEF DESCRIPTION OF THE DRAWINGS

To describe the manner in which the above recited and other advantages and features can be obtained, a more particular description of the aspects of one or more embodiments briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of scope, one or more embodiments of the invention will be described and explained with additional specificity and detail through the use of the accompanying drawings in which:

FIG. 1 illustrates a schematic diagram of a communication environment according to one or more embodiments of the present disclosure;

FIGS. 6 and 7 illustrate an event management graphical user interface through which a user can create an electronic survey by including a survey system identifier in an event communication according to one or more embodiments of the present disclosure;

FIG. 10 illustrates a portion of an example electronic survey that a survey system can provide to parties of an electronic communication from a sender user in accordance with one or more embodiments of the present disclosure;

DETAILED DESCRIPTION

Figure 2A:
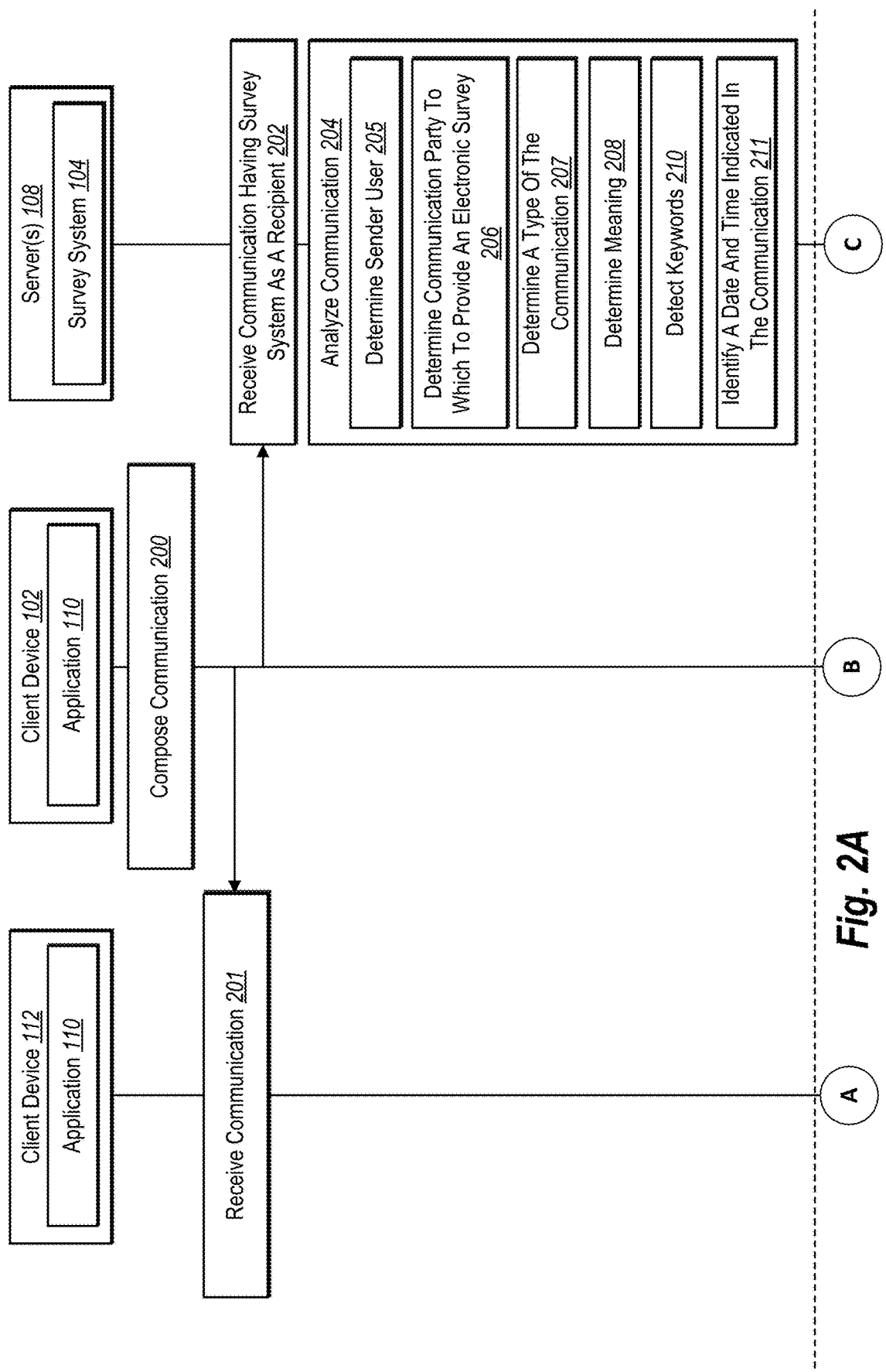
FIGS. 2A and 2B illustrate a sequence-flow diagram of an electronic survey system creating and distributing an electronic survey to a client device according to one or more embodiments of the present disclosure.

Embodiments of the present disclosure include an electronic survey system for creating and distributing an electronic survey to recipient parties of an electronic communication (e.g., an email, a meeting invitation) in response to the electronic survey system being a recipient of the communication. In one or more embodiments, for example, the electronic survey system creates an electronic survey in response to receiving an electronic communication based on a sender user including a survey system identifier as a recipient of the electronic communication. In addition, the electronic survey system distributes the electronic survey to client device(s) associated with one or more additional parties of the communication, and in turn, the electronic survey receives responses to the electronic survey, and reports the responses to the sender user of the electronic communication. Accordingly, the electronic survey system allows a sender user to efficiently and intuitively cause the creation and administration of an electronic survey based on a sender user causing an electronic communication to be sent to the electronic survey system.

In various embodiments of the electronic survey system, a sender user can include a survey system ID within an electronic communication. For instance, a sender user of an email meeting invite can include an email address associated with the electronic survey system within a recipient field of an email meeting invite. In addition, the sender user can include additional parties as recipients of the email meeting invite by including the email addresses of the additional parties. Due to the inclusion of the survey system ID, the electronic survey system receives the email meeting invite, and in response, the electronic survey system can identify an electronic survey. The electronic survey system then provides the electronic survey to the additional parties by sending a survey invite to the email addresses of the additional parties.

The electronic survey system can identify, determine, or otherwise generate an electronic survey in various manners. In some embodiments, the electronic survey system can identify a standard electronic survey associated with the type of electronic communication the electronic communication received. For instance, based on receiving an email meeting invite, the electronic survey system can identify a generic meeting feedback survey. In other embodiments, the electronic survey system can determine an electronic survey based on the sender user. For instance, a sender user can have previously customized an electronic survey within the electronic survey system, and the electronic survey system identifies the customized survey based on determining a sender user identifier within the electronic communication. Furthermore, in some embodiments, the electronic survey system can analyze content of the electronic communication to generate an electronic survey. For instance, the electronic survey system can detect or recognize keywords or phrases to generate electronic survey questions to include within an electronic survey.

In addition to creating an electronic survey based on receiving an electronic communication, the electronic survey system can further identify one or more survey recipients. For instance, and as mentioned above, the electronic survey system can create a survey recipient list that includes the additional parties to a received electronic communication. In other embodiments, a sender user can be associated with a predefined recipient list. Accordingly, upon receiving an electronic communication from the sender user, the electronic communication system can identify the predefined recipient list. In addition, a sender user can customize which parties of an electronic communication participate in an electronic survey by including some parties in a first party type, and other parties in a second party type (e.g., direct recipient parties of an email versus cc'd or bcc'd parties of an email).

After determining a recipient list, the electronic survey system can distribute the identified electronic survey to the parties on the recipient list. In one or more embodiments, the electronic survey system can determine a date and time to administer the electronic survey based on information included within the electronic communication sent by the sender user. For instance, in the event that the electronic communication is an email meeting invite, the electronic communication system can determine to provide the electronic survey after the end time of the meeting indicated in the email meeting invite. In other embodiments, the sender user can include a date and time within the electronic communication (e.g., within a subject line), and the electronic survey system schedules the administration of the electronic survey accordingly. In some cases, the electronic survey system can distribute the electronic as soon as possible after receiving the electronic communication.

After distributing the electronic survey, and receiving survey responses, the electronic survey system can provide feedback (i.e., results of an administered electronic survey) to a sender user of the electronic communication. In some embodiments, the electronic survey system can automatically provide the electronic survey results without requiring the sender user login to the electronic survey system. For example, the electronic survey system can create a survey report that indicates the results of the survey and/or analysis of the results. The electronic survey can then provide the sender user a survey results communication using the sender user's identifier from the original electronic communication from the user. For instance, the electronic survey system can respond to the sender user's original electronic communication and insert the survey report into the response communication.

Various embodiments of the electronic survey system discussed above, as well as the additional embodiments described in detail below, provide various advantages over conventional systems. For example, unlike conventional systems, a sender user can cause the electronic survey system to administer an electronic survey to a defined group of participants without ever creating an account with the survey system. Indeed, some embodiments of the electronic survey system generate and administer a survey in response to any sender user including a survey system identifier within an electronic communication, regardless of whether or not the sender user has had any previous interactions with the electronic survey system. Thus, unlike conventional systems that require a user account and user login, the electronic survey system can provide access to any person that has access to an electronic communication system (e.g., email system).

Additionally, in contrast to conventional systems that often impose a time constraint and technological know-how barrier that causes a user to forgo creating the electronic survey, the electronic survey system described herein can provide an intuitive and efficient option for users seeking feedback from one or more individuals. For instance, in comparison to conventional survey systems that typically require a complex and time-consuming survey composition process, the electronic survey system can generate and administer an electronic survey, as well as collect and provide results of the electronic survey, based on a familiar process of composing an electronic communication. In particular, the electronic survey system can seamlessly work with all types of familiar communication platforms (e.g., email platforms, social networking platforms, instant message platforms, text messaging platforms, etc.). Accordingly, the electronic survey system significantly decreases the time constraints and technological know-how barriers associated with conventional systems.

Furthermore, because the survey system provides an electronic survey to additional parties of a received electronic communication, the electronic survey system overcomes the technological limitations of conventional systems that require a survey administrator to manually input recipients. Indeed, the electronic survey system described herein overcomes the digitally isolated conventional survey creation systems without compromising the security of the electronic communication system. By creating an electronic survey based on receiving an electronic communication, the electronic survey system effectively and securely controls the amount and type of access a user (e.g., even an unknown user) has to the electronic survey system, while at the same time providing a user access to the benefits and feature of the electronic survey system.

Additionally, the electronic survey system described herein can improve the performance of computer systems by reducing required processing power and communication bandwidth. In particular, because the electronic survey system enables a sender user to cause the electronic survey system to administer an electronic survey by merely sending an electronic communication (from a communication platform) and without logging into the electronic survey system, the electronic survey system requires less communication bandwidth in comparison to conventional survey systems. Furthermore, because the survey system does not require an account creation to provide an electronic survey, the survey system requires less processing power and memory in comparison to convention survey systems.

The above, as well as additional advantages of the electronic survey system will become apparent based on the additional detailed discussed below. The following terms will be used through the specification to provide a clear description of the various embodiments of the electronic survey system. As used herein, the term "electronic survey" or simply "survey" refer to a digital channel used to collect information. For example, the term survey can include a digital communication in the form of a poll, questionnaire, census, or other type of sampling. To illustrate, a survey can include a digital communication that includes one or more electronic survey questions. Further, the term survey can generally refer to a method of requesting and collecting response data from respondents via a digital channel, such as, for example, a text message, an instant message, an application, a social media post, an email, and/or a web interface.

Additionally, as used herein, the term "electronic survey question," "survey question," or simply "question," refers to a prompt included in an electronic survey to invoke a response from a respondent. For example, a survey question can include one of many different types of questions, including, but not limited to, perception, multiple choice, open-ended, ranking, scoring, summation, demographic, dichotomous, differential, cumulative, dropdown, matrix, net promoter score (NPS), single textbox, heat map, and any other type of prompt that can invoke a response from a respondent. A survey question can include a prompt portion as well as an available answer portion that corresponds to the survey question.

As used herein, the term "electronic communication," or simply "communication," refers to a user-generated digital message. In some cases, a communication is directed to one or more parties (e.g., intended recipients of the communication) including a party identifier within the communication. In addition, as disclosed herein, a communication can be directed to an electronic survey system by include a survey system identifier within the communication. Furthermore, a communication can include content that conveys various types of information, as discussed further below. Examples of an electronic communication include, but are not limited to, an email message, a text message, an instant message, a specialized or native application message, a social media post, or other form of digital communication.

Furthermore, as used herein, the term "party" or "parties" refer to a user or users that are addressees of an electronic communication. In some cases, a party is represented by a party identifier, or simply party ID, within an electronic communication. For example, a party ID can include an email address (user@email.com), an IM handle, a phone number, or a username. As will be described further below, the electronic survey system can send a party of a communication an electronic survey based on the electronic survey system detecting a party ID associated with the party within a communication sent by a sender user. As used herein, a "sender user" refers to an individual that composes an electronic communication using an electronic communication system, and causes the communication system to send the electronic communication to one or more parties. For example, the term sender user can refer to organizer of an event that sends an event invite within a communication.

The term "survey system identifier" or "survey system ID" refers to an identifier that, if included as a recipient in an electronic communication, causes the electronic communication to be sent to the electronic survey system. Like a party ID, the survey system ID can include an email address (surveys@email.com), an IM handle, a phone number, or a username. As will be discussed in detail below with respect to the figures, a sender user can include a survey system ID within an electronic communication to cause the electronic survey system to generate and distribute an electronic survey to any other parties of the electronic communication. Throughout the discussion in the figures, the electronic survey system will be referred to as a recipient of an electronic communication, while users will be referred to parties of an electronic communication.

FIG. 1 illustrates a schematic diagram of a communication environment 100 according to an embodiment of the present disclosure. As shown in FIG. 1, the communication environment 100 can include various components for performing the processes and features described herein. For example, the communication environment 100 includes a plurality of client devices 102, 112, 114 (collectively, the "client devices"), and a survey system 104 on one or more server(s) 108, which are communicatively coupled through a network 106. Although FIG. 1 illustrates a particular arrangement of the client devices 102, 112, 114 and the survey system 104, various additional arrangements are possible. For example, the client devices 102, 112, and 114 can directly communicate with the survey system 104, bypassing the network 106.

The client devices can be any one or more of various types of computing devices. For example, each of the client devices 102, 112, 114 can include a mobile device such as a mobile telephone, a smartphone, a PDA, a tablet, or a laptop, or a non-mobile device such as a desktop, or another type of computing device. In addition, the server(s) 108 can include one or more locally networked servers (e.g., within a data center), remote servers (e.g., cloud-based servers), or a combination of local and remote server devices. Additional details with respect to the client devices 102, 112, 114 and server(s) 108 are discussed below with respect to FIG. 19.

As further illustrated in FIG. 1, the client devices can include application 110 for facilitating communication (e.g., reading, composing, and/or sending electronic communications) between and on the client devices associated with the users, and the survey system 104. For example, in some instances, the application 110 can include one or more of an email application, a social networking application, a messenger application, a text messenger, a web browser, etc. Moreover, in one or more embodiments, the application 110 can be a native application installed on the client device 102. For example, the application 110 can be a mobile application that installs and runs on a mobile device, such as a smart phone or a tablet. In other embodiments, the application 110 can be a desktop application, widget, or other form of a native computer program. Additionally, the application 110 can be a remote application accessed by the client device 102. For instance, the application 110 can be a web application that is executed within a web browser of the client device 102.

The client devices and the survey system 104 can communicate via the network 106, which can include one or more networks that use one or more communication platforms or technologies suitable for transmitting data and/or communication signals. In one or more embodiments, the network 106 includes a combination of cellular network and the Internet or World Wide Web. The network 106, however, can include various other types of networks that use various communication technologies and protocols, such as a corporate intranet, a virtual private network (VPN), a local area network (LAN), a wireless local network (WLAN), a cellular network, a wide area network (WAN), a metropolitan area network (MAN), or a combination of two or more such networks. Additional details relating to the network 106 are explained below with reference to FIGS. 19 and 20.

As further illustrated in FIG. 1, users 116, 118, and 120 (collectively, the "users") can interface with the respective client devices, for example, to access and/or respond to electronic surveys from the survey system 104. The users can be individuals (i.e., human user), businesses, groups, or any other entities. One of ordinary skill in the art will understand that the communication environment 100 can include any number of client devices and users, with each of the users interacting with the communication environment 100 using a corresponding client device.

As noted above, the survey system 104 can create and administer electronic surveys to one or more of the users of the client devices. For example, and as is discussed in greater detail below in regard to FIGS. 2A and 2B, the user 116, acting as a sender user, can compose and send a communication (e.g., an email meeting invite) via the client device 102 to the client devices 112, 114 associated with users 118, 120 by including the users 118, 120 as parties of the communication. For example, the sender user 116 can include users 118, 120 as invitees, participants, recipients, attendees, or tagged entities of the communication by inputting the party IDs associated with each user 118 and 120 within an addressee field of the communication.

In addition, the sender user 116 can include a survey system ID as an addressee within an electronic communication to send the survey system 104 the communication. In other words, by the sender user 116 addressing a communication to the survey system ID, the survey system 104 becomes a recipient of the communication. Furthermore, in response to receiving the communication, the survey system 104 can create and provide an electronic survey to the users 118, 120 (i.e., the parties of the communication). Moreover, based on survey responses received from the users 118, 120 via client devices 114, 112, the survey system 104 can provide survey feedback, results, and/or reports to the sender user 116 via client device 102.

Figure 2B:
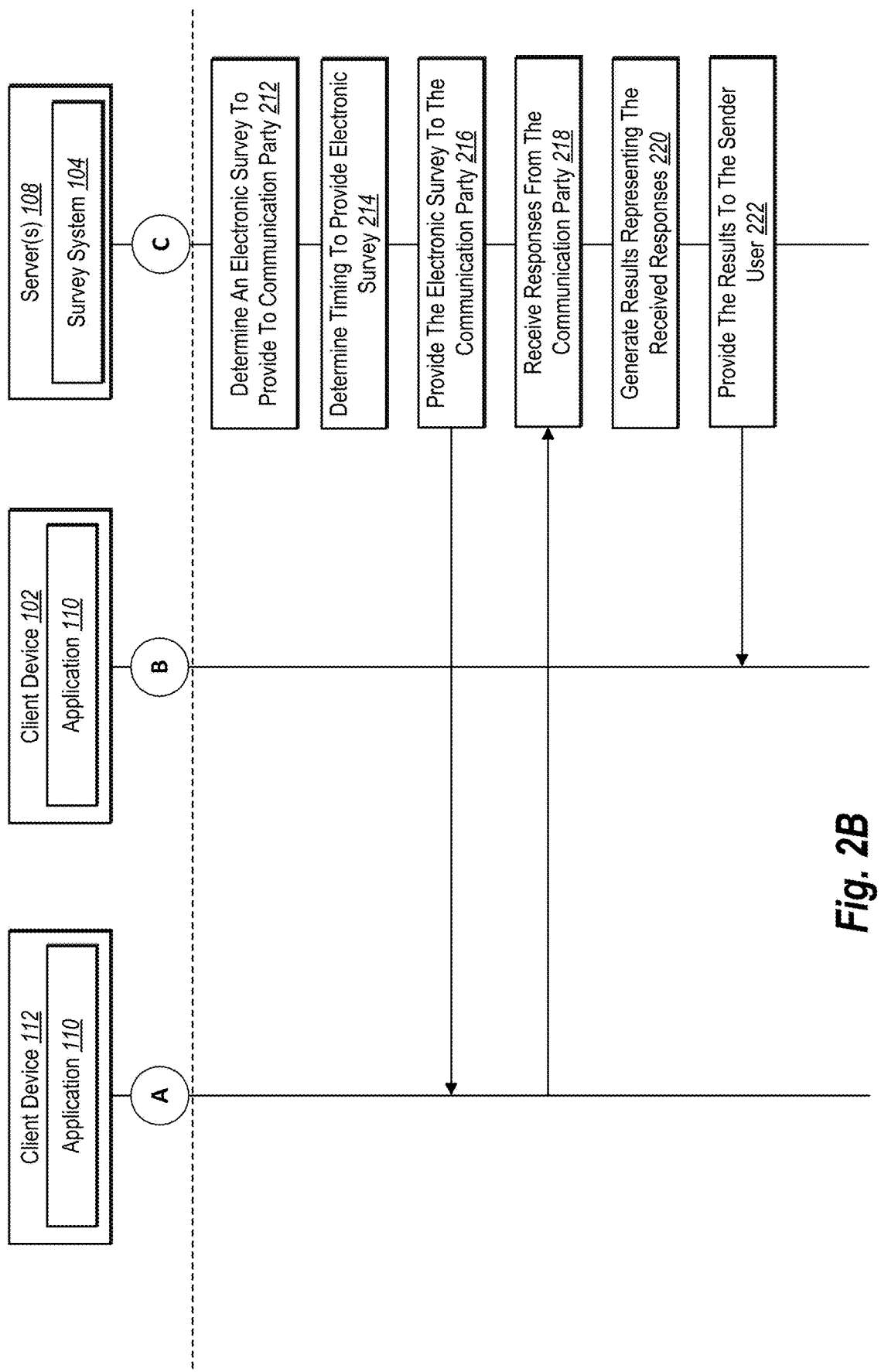

FIGS. 2A and 2B illustrate a sequence-flow diagram showing various acts of the survey system 104 on server(s) 108, the application 110 on client device 102, and application 110 client device 112 in accordance with various embodiments of the survey system 104. The client device 102, the client device 112, application 110, and the survey system 104 shown in FIGS. 2A and 2B can be example embodiments of the client device 102, the client device 112, application 110, and the survey system 104 described in regard to FIG. 1. Of note, in one or more embodiments, the survey system 104 can perform the various processes described herein without creating an account for a user with the survey system 104 or providing any additional information to the survey system 104, but rather by simply including a survey system ID as a recipient of a communication. As a result, as will be discussed in greater detail below, the sender user can cause the survey system 104 to create and distribute an electronic survey to parties of a communication without creating an account with the survey system 104 or having any prior interaction with the survey system 104.

As shown in FIG. 2A, a sender user associated with the client device 102 can compose a communication 201. For instance, the sender user can access the application 110 to compose an email, meeting invite, social networking message, IM message, text message, or other electronic communication. As part of composing the communication, the sender user can include one or more users as parties to the communication. For instance, the sender user can input a party ID input a party ID (e.g., user1@company.com) associated with a party to cause the client device 102 to send the communication to client device 112 associated with the party. Although FIGS. 2A-2B illustrate the single client device 112 associated with the party, it is understood based on the disclosure herein that the sender user can send the communication to any number of parties.

In addition to adding parties to the communication, the sender user can input a survey system ID to include the survey system 104 as a recipient of the communication. For example, the sender user of the client device 102 can input a survey system ID associated with the survey system 104 within the communication to cause the communication to be sent to the survey system 104. As will be discussed in detail below, by including the survey system ID in the communication, the survey system 104 receives the communication, and in response, generates and distributes a survey.

The survey system 104 can interface with various types of electronic communication, and as such, the sender user can compose various types of communications. For example, the communication can include an email, a text message, a social networking system communication (e.g., post), an instant message, an event invite, a video conference invite, a teleconference invite, or other type of electronic communication. In general, the survey system 104 can interface with any communication type that allows the sender user to input party IDs and the survey system ID.

Based on the type of communication the sender user composes, the form of the survey system ID can vary (as well as the party ID). For instance, in the case the communication is an email or email event invite, the system ID can be an email address (e.g., mysurvey@system.com). As an additional example, when the communication includes a text message, the survey system ID can be telephone number associated with the survey system 104. As yet another example, when a communication includes a social network communication (e.g., a post, a message, an event, etc.). Furthermore, the sender user can input a survey system ID as a social networking tag or instant message handle associated with the survey system 104 (e.g., @surveysystem). In other embodiments, a survey system ID is a username or other form of a communication system identifier associated with the survey system 104.

Notwithstanding the type of communication or a format of the survey system ID, the sender user can input various content into a communication. For example, the content of a communication can include an invitation to an event or meeting. Additionally, the content of the communication can include a written communication, a digital photo, a digital video, digital audio, a presentation, a report, or any other content on which the sender user wishes to collect feedback using an electronic survey. For instance, as a non-limiting example, the communication can include a digital video, and the survey system 104 can provide an electronic survey to the parties that includes one or more questions relating to the digital video. In yet further examples, the content of the communication can include a hyperlink to one or more web pages, and the survey system 104 can provide an electronic survey to the parties that includes survey questions relating to the content of the web pages to which the hyperlink points.

After the sender user composes the communication, the sender user can cause the client device 102 to send the communication to a party associated with client device 112. Based on the client device 102 sending the communication, the client device 112 associated with the party can receive the communication 201, as illustrated in FIG. 2A. As shown in act 202 of FIG. 2A, the survey system 104 also receives the communication based on the communication including the survey system 104 as a recipient of the communication. As discussed above, the survey system 104 can receive the communication from the client device 102 based on a sender user of the client device 102 inputting a survey system ID associated with the survey system 104 within the communication to cause the communication to be sent to the survey system 104.

In one or more embodiments, upon receiving a communication, the survey system 104 creates survey data within a survey data base that is associated with the communication. For example, the survey system 104 assigns a survey ID to the received communication, and then associates various data from the communication with the survey ID in order to create, distribute, manage, and report the survey. For instance, based on receiving the communication from the client device 102, the survey system 104 analyzes the communication, as shown in act 204 of FIG. 2A. Based on the analysis of the communication, for example, the survey system can associate a sender ID, one or more party IDs, communication type, content information, question IDs, survey responses, survey results, and other data or information that corresponds to the survey the survey system 104 generates based on the communication.

For example, as part of analyzing the communication, the survey system 104 can identify the sender user, as show in act 205 of FIG. 2A. For example, the survey system 104 can identify the sender user by detecting the sender ID (e.g., similar to a party ID associated with the sender user) within a sender field of the communication, such as a header portion of an email that includes the sender user's email address. Similarly, the survey system 104 can identify the sender user of other communication types by identifying a handle, username, phone number or other ID format associated with the sender user, as discussed above. In some instances, the survey system 104 can identify the sender user of the communication from metadata included with the communication.

Generally, upon identifying the sender ID, the survey system 104 can store the sender ID within a survey database as the "administrator" of the electronic survey. For instance, the survey system 104 can use the sender ID to request additional information from the sender user (e.g., by sending a follow up communication). In addition, in some embodiments, the sender user may have previously set up a default survey within the survey system 104. Accordingly, upon identifying the sender ID, the survey system can determine if there is a default survey associated with the sender ID, and thus prepare a survey based on the default survey. The survey system 104 can further use the sender ID to send notifications about a survey to the sender user, such as, notifications about the distributing the survey, parties that have responded to the survey, parties that need to respond to the survey, etc. In addition, and as described below, the survey system 104 can use the sender ID to provide the sender user the results of the survey. It should be understood, based on the disclosure herein, that the survey system 104 can perform various other functions based on identifying and using the sender ID.

In addition to identifying the sender ID, and as shown in act 206 of FIG. 2A, the survey system 104 can determine or otherwise identify the parties of the communication. In general, the survey system 104 creates a survey recipient distribution list based on the identified parties. To identify the parties, the survey system 104 identifies party IDs within the communication. Accordingly, based upon determining party IDs, the survey system 104 creates a survey recipient list that includes the party IDs corresponding to each of the parties.

In addition to analyzing the communication to determine a sender ID and one or more party IDs, the survey system 104 can also analyze the communication to identify a type of the communication, as shown in act 207 of FIG. 2A. For example, the survey system 104 can determine, based on the received communication, a type of the communication. In some embodiments, the survey system 104 can determine the type of the communication based on the communication platform or channel through which the communication was received. For example, if the communication was received through a particular communication platform, the survey system 104 can determine that the type of communication matches the communication platform. The survey system 104 associates the communication type with the survey to allow the survey system 104 to access the appropriate communication platform or channel for communicating with the sender user and the one or more parties. For instance, in some embodiments, the type of communication may be an email, and thus the survey system 104 can access data indicating the type of communication to generate an email communication within which the survey system provides an electronic survey, provides results of an electronic survey, or otherwise communicates with the survey sender and/or the parties.

As discussed briefly above, in some embodiments, identifying survey content within the communication can also determining a meaning of content within the communication, as shown in act 208 of FIG. 2A. For example, in the event the communication includes an invite to an event, content of the communication can identify the event, the time and date of the event, the subject of the event, event materials (e.g., a presentation or an agenda), text description of the event, and invited parties to the event. The communication can include other content, some as discussed above.

In some examples, the survey system 104 can include a natural language processing ("NLP") system for processing and deriving meaning from text input (e.g., text within a body of an email). For example, the survey system 104 can use one or more NLP systems known in the art to analyze textual content within the communication. Accordingly, the survey system 104 can analyze content (e.g., user input) included within the communication using an NLP system to determine and derive meanings of the textual content. The survey system 104 can analyze content included in a subject line of an email, a body of an email, a body of a social networking communication, a body of a text message, message header information, body of an instant message, etc.

Furthermore, based on the natural language processing analysis, the survey system 104 can identify survey content to use in generating and distributing an electronic survey. For example, the survey system 104 can determine that the content of the communication indicates an event related to a particular topic. In particular, and as will be discussed in greater detail below, the survey system 104 can identify a topic associated with an event invite, and in response, the survey system can create one or more survey questions related to the topic to provide as part of an electronic survey.

As discussed briefly above, in addition to determining meanings of content within the communication, in some embodiments analyzing content within the communication includes detecting one or more keywords, as shown in act 210 of FIG. 2A. In particular, the survey system 104 can include a keyword detection system for processing and detecting keywords from text-based user input (e.g., user composed content). For example, the survey system 104 can use or access one or more keyword detection systems that analyze text-based content to determine keywords based on word usage, word frequency, sentence structure, and other features and characteristics of the text-based content. Accordingly, the survey system 104 can analyze text-based content included within the communication to determine and detect keywords. In some embodiments, the survey system can use similar systems to detect key phrases within the communication, where a phrase is a combination of multiple words.

In one or more embodiments, the keywords and phrases can be defined by the sender user and/or survey system 104. For example, the survey system 104 can associate particular defined keywords and/or phrases with particular electronic surveys that correspond to a given sender ID. As a result, the survey system 104 can identify the sender ID of a communication, search and detect keywords and/or phrase within the communication, and access and electronic survey associated with the keyword and the sender ID. For example, a sender user may include the text "Meeting Survey" within a communication, and in response to detecting the sender ID, and the keywords "Meeting Survey," the survey system 104 can access and provide an electronic survey that includes questions related to obtaining feedback on a meeting to the parties of the communication.

In some embodiments, in addition to analyzing survey content within the communication, the survey system 104 can identify content representing a time component to be associated with distribution of an electronic survey. For example, the survey system 104 identifies a date and time indicated in the communication, as shown in act 211 of FIG. 2A. For example, the survey system 104 can analyze metadata associated with the communication (e.g., email header, social networking communication header, etc.), and/or user input within a body of the communication, to identify a date and time. In some embodiments, the survey system 104 can utilize the identified date and time to determine when to send an electronic survey to the other parties of the communication, or in other words, the survey system 104 can schedule to provide an electronic survey to the other parties at a date and time detected within the communication.

Upon analyzing the communication, the survey system 104 determines an electronic survey to provide to the other parties of the communication based on the analysis, as shown in act 212 of FIG. 2A. In some instances, based on the type of the communication, the survey system 104 can identify an electronic survey to provide to the other parties of the communication. In some embodiments, based on the determined meaning and detected keywords of the communication, the survey system 104 can identify an electronic survey to provide to the other parties of the communication. In additional embodiments, based on the determined meaning and detected keywords of the communication, the survey system 104 can generate an electronic survey to provide to the other parties of the communication. Each of the foregoing is described in greater detail below.

As mentioned above, based on the type of the communication, the survey system can identify an electronic survey to provide to the other parties of the communication. For example, if the communication is an invite to an event and/or a meeting, the survey system 104 can identify an electronic survey related to events and/or meetings to provide to the other parties of the communication. As another example, if the communication includes a media attachment (e.g., a video, an audio file), the survey system 104 can identify an electronic survey related to media attachments. In some embodiments, the survey system 104 can query a survey database to identify an electronic survey related to the determined type of the media attachment.

As noted above, in some embodiments, based on the determined meaning and detected keywords of the communication, the survey system 104 can identify an electronic survey to provide to the other parties of the communication. For example, the survey system 104 can query a survey database of the survey system 104 and can identify one or more electronic surveys that correlate with determined meanings and detected keywords of the communication. For instance, the survey system 104 can compare meanings and keywords to electronic surveys within the survey database of the survey system 104.

To illustrate, if the survey system 104 determines that the communication relates to an event including a presentation, the survey system 104 can identify an electronic survey correlating to events having a presentation. As another example, if the survey system 104 determines that the communication relates to an event where one or more media resources (e.g., slide show, video, music, etc.) will be used, the survey system 104 can identify an electronic survey correlating to events integrating media resources, where the electronic survey includes questions about media resources. As yet another example, if the survey system 104 determines that the communication relates to a meeting where the sender user will conduct the meeting, the survey system 104 can identify an electronic survey correlating to a meeting conductor's performance.

As also mentioned above, in additional embodiments, based on the determined meaning and detected keywords of the communication, the survey system 104 can generate an electronic survey to provide to the other parties of the communication. For example, based on the determined meaning and detected keywords of the communication, the survey system 104 can customize questions of an electronic survey to ask about particular elements of the communication. For instance, if the survey system 104 determines that the communication relates to an event concerning a presentation by the sender user, the survey system 104 can customize a question to specifically ask about the presentation by the sender user (e.g., recite "How would you rate [sender user's name]'s overall presentation today?").

To illustrate additional examples, if the survey system 104 determines that the communication relates to an event concerning a presentation on a particular topic, the survey system 104 can customize a question to specifically concern the particular topic (e.g., recite: "On a scale from 1 to 10 (10 being very entertaining), how entertaining was the presentation on [the particular topic]?"). Determining an electronic survey and/or electronic survey questions to provide to other parties of the communication is described in greater detail below in regard to FIGS. 3A-4.

In addition to determining an electronic survey to provide to the other parties of the communication, the survey system 104 determines a timing to provide the electronic survey to the other parties of the communication, as shown in act 214 of FIG. 2B. In one or more embodiments, a user can specify a timing to provide the electronic survey either in the communication itself, or based on preconfigured settings. For instance, the survey system 104 can base an electronic survey distribution schedule on the date and time of an event. In other instances, the sender user can specify the timing relative to a time the survey system receives the communication (e.g., a number of minutes, hours, days, weeks, months, years from the survey system receiving the communication). As another example, the survey system 104 can determine a timing to provide the electronic survey to the other parties of the communication based on a time at which the survey system 104 received the communication. In additional embodiments, the user can indicate a specific date and time within the communication to distribute an electronic survey.

Furthermore, for example, when the communication includes an invite to an event (e.g., and email meeting invite), the content of the communication can include a time and date of the event. In such a case, the survey system 104 can schedule a distribution of a survey to occur after the event. For instance, a meeting invite may indicate that a meeting starts at 9 am and ends at 10 am. Based on the survey system 104 identifying the end time of the meeting, the survey system 104 can schedule the distribution of an electronic survey related to the meeting ending at 10 am (e.g., the survey system 104 distributes the survey at 10 am). Similarly, the survey system 104 can determine to provide the electronic survey before a starting time of the time period, a particular period of time (e.g., 5 minutes) before an ending time of the time period, at an ending time of the time period, a particular period of time after an ending time of the event, or any other time relative to the time period.

As mentioned briefly above, in additional embodiments, the survey system 104 can determining a timing to provide the electronic survey to the other parties of the communication based on a time at which the survey system 104 received the communication. For example, if the communication is not an invitation to an event, the survey system 104 can determine to provide the electronic survey at a time relative to a time of receiving the communication. In particular, if the survey system 104 determines that the communication does not indicate a particular time period (e.g., an event or particular date and time) and the timing is not specified in the content of the communication, the survey system 104 can determine to provide the electronic survey in response to (e.g., immediately after) receiving the communication, within a period of time (e.g., 10 minutes, an hour, a day) after receiving the communication, or any other time, etc.

Upon determining an electronic survey to provide to the other parties of the communication and a timing to provide the electronic survey, the survey system 104 provides the electronic survey to the other parties of the communication according to the determined timing, as shown in act 216 of FIG. 2B. For instance, the survey system 104 can generate a survey communication that include the parties as recipients of the survey communication. In some embodiments, the survey communication includes an electronic survey within a body of communication. In additional embodiments, the survey communication can include a hyperlink within the body of the communication inviting the party to participate in the electronic survey by selecting the hyperlink. The hyperlink can direct the party to a web interface through which the party can participate in the electronic survey. For example, the hyperlink can direct the party to a webpage of the survey system, which can provide one or more survey questions to the party through the web interface.

As indicated above, the survey system 104 can provide the survey communication via a same type of communication as the communication received from the sender user. For example, the survey system 104 can provide the electronic survey via one or more of an email, a social media communication, a text message, etc., depending on whether the sender user sent an email, a social media communication, a text message, etc. In this manner, the survey system 104 can access and generate the type of communication the corresponds to the party IDs included in the communication the sender user composed. In particular, the survey system 104 generates a survey email and inputs the email address of the parties as recipients of the survey email.

In response to providing the survey communication that provides access to the electronic survey to the parties of the sender user's communication, the survey system 104 receives one or more responses from the other parties, as shown in act 218 of FIG. 2B. As used herein, the term "response" refers any type of electronic data representing a response that a party provides with respect to an electronic survey question. Depending on the question type, the response can include, but is not limited to, a selection, a text input, an indication of an answer, an actual answer, and/or an attachment. For example, a response to a multiple-choice question can include a selection of one of the available answer choices associated with the multiple-choice question. As another example, a response can include a numerical value, letter, or symbol that that corresponds to an available answer choice. In some cases, a response can include a numerical value that is the actual answer to a corresponding survey question. In some embodiments, the one or more responses can include responses received via the same mode of communication as the communication from the sender user. For example, a party can provide responses via a response email. In other embodiments, the one or more responses can include responses received via a web interface such as the web interface described above.

Upon receiving the one or more responses, the survey system 104 generates results representing the one or more responses, as shown in act 220 of FIG. 2B. For example, the survey system 104 can compile received responses into a set of results (i.e., reports). In some instances, the survey system 104 can compile received responses over time. For example, if feedback was sought previously on a presenter's performance, and feedback is sought again, the set of results can show feedback over time (i.e., on a timeline) and can show changes in feedback. In some embodiments, the survey system 104 can generate one or more graphical representations (e.g., graphs, timelines, tables, etc.) of the set of results. For example, in one or more embodiments, the survey system 104 can generate graphs with markers identifying the results.

In response to generating the results, the survey system 104 provides the results to the sender user, as shown in act 222 of FIG. 2B. For example, survey system 104 can provide the results via the same mode of communication as the communication received from the sender user. For instance, the survey system 104 can generate a results communication having the sender user the recipient of the results communication and including the generated results as the content of the communication. For example, the results communication can include one of an email, a link in an email or other communication, a social networking communication, a text message, instant message, etc. In some embodiments, the survey system 104 provides the sender user (e.g., user/organizer) with an ongoing report on the sender user's leadership skills based on the feedback from each meeting interaction. The results communication is described in greater detail in regard to FIGS. 11-15.

Referring to FIGS. 2A and 2B together, and as a result of the foregoing, a sender user can utilize the survey system 104 to cause the electronic survey system 104 to administer an electronic survey to the parties (e.g., the participants of an event) and can receive individualized results without ever creating an account with the survey system 104. Accordingly, the survey system 104 of the present disclosure can provide an intuitive, easy to use, and efficient option to users seeking feedback in comparison to conventional survey systems, which typically require account creation and more complex and time-consuming survey composition steps to create and administer electronic surveys.

Furthermore, as a result of the foregoing, a sender user (e.g., organizer of an event) utilizing the survey system 104 of the present disclosure can cause an electronic survey to be administered to the parties (e.g., the participants of the event) and can receive individualized results without ever leaving the software and/or applications utilized to create and send the communication. Put another way, the sender user can utilize familiar software and/or applications to cause the electronic survey to be administered and to receive results from the electronic survey. As a result of this additional advantage, the survey system 104 of the present disclosure can provide a more attractive option to users seeking feedback in comparison to conventional survey systems, which typically require a user to learn a new application and to utilize the new application to administer a survey and receive results. Accordingly, the survey system 104 can result in increased usage of the survey system 104 in comparison to conventional survey systems.

Moreover, based on this disclosure, one will recognize that, because the survey system 104 of the present disclosure provides an electronic survey in response to merely receiving a communication (e.g., an email, text, social media communication), the survey system 104 can seamlessly function with various types of communication platforms (e.g., email, social networking systems, texting platforms, etc.). As a result of the foregoing, the survey system 104 is relatively communication mode agnostic. Accordingly, the survey system 104 of the present disclosure provides a more versatile and convenient method for providing electronic surveys and receiving results in comparison to conventional survey systems.

Figure 3A:
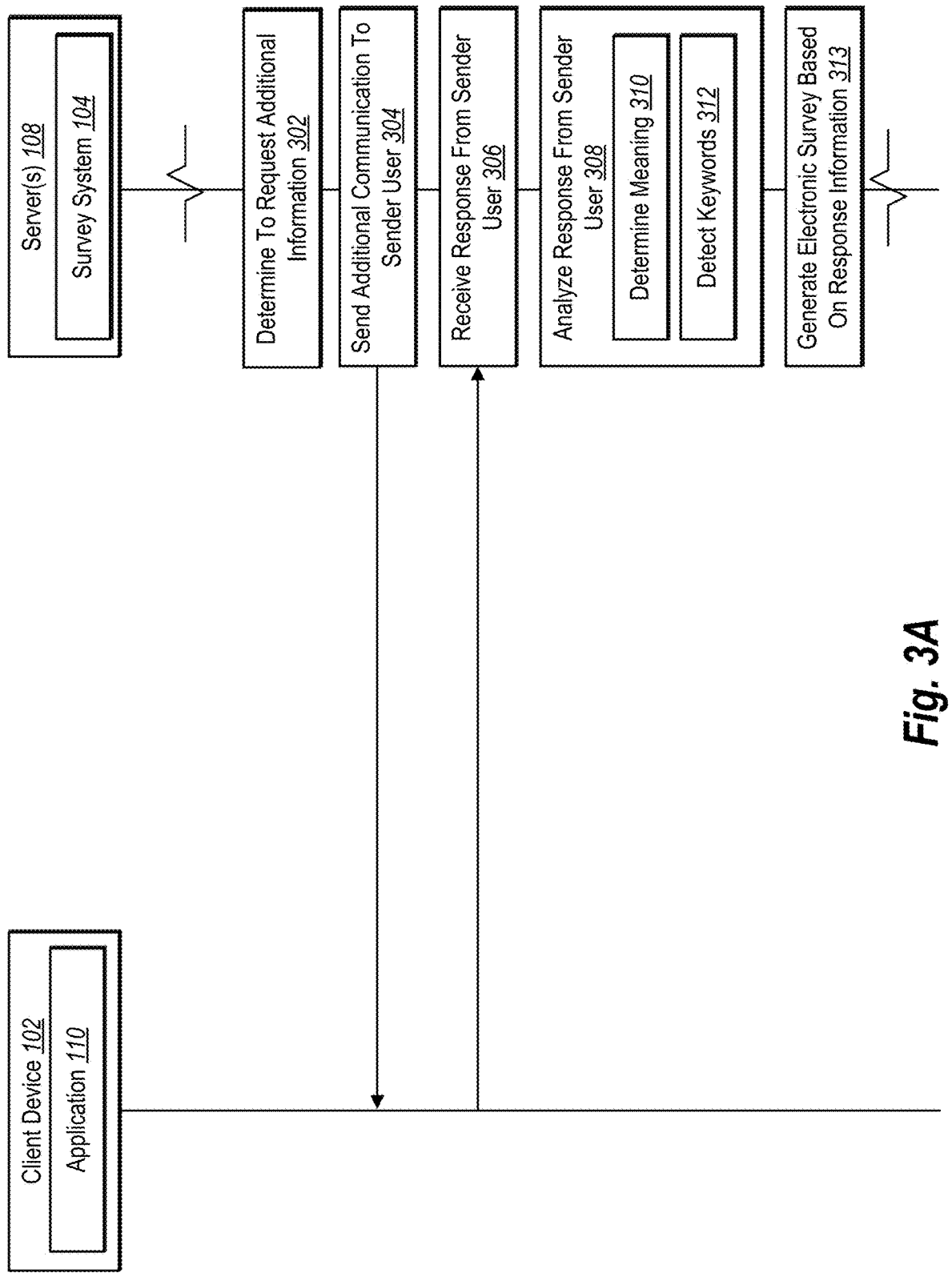
FIG. 3A illustrates a sequence-flow diagram of an electronic survey system distributing electronic survey inquiries to a client device according to one or more embodiments of the present disclosure.

As mentioned above, some embodiments of the survey system 104 enable the sender user to customize an electronic survey without creating an account with the survey system 104. For example, FIG. 3A illustrates a sequence-flow diagram showing one or more acts that the survey system 104 can perform in generating an electronic survey to enable a sender user to customize an electronic survey according to additional embodiments of the present disclosure. Using one or more of the above-described features in regard to FIGS. 2A and 2B, the survey system 104 can determine an electronic survey to provide to other parties as shown in act 302 of FIG. 3A.

Furthermore, in some embodiments, determining an electronic survey to provide to other parties can include obtaining additional information from the sender user of the communication in order to enable the sender user to customize the electronic survey. For example, as shown in act 304 of FIG. 3A, in response to receiving the communication from the client device 102, the survey system 104 can send an additional communication to the sender user of the communication. In particular, the survey system 104 can send an additional communication having one or more inquiries about potential electronic surveys or survey questions to provide to the other parties of the communication. In some embodiments, the additional communication can include verifying inquiries to verify that the survey system has appropriately identified topics about which to provide electronic survey questions. Moreover, the additional communication can include general inquiries asking the sender user for instructions on what questions to provide in an electronic survey. In some embodiments, the additional communication can include a hyperlink for directing the sender user to a webpage including the one or more inquiries.

As shown in act 306 of FIG. 3A, the survey system 104 receives a response from the sender user. For example, the survey system 104 can receive the response via a mode of communication utilized for the communication from the sender user (e.g., the original communication having the survey system 104 as a party). In additional embodiments, the survey system 104 can receive the response from the sender user via a web interface. A response can include sender-user-provided content within defined fields of the additional communication. For example, the additional communication from the survey system 104 can include one or more fields within which the sender user inputs a response. For instance, the sender user can compose one or more survey questions within one or more fields within the additional communication, and accordingly, the survey system can include those questions directly in the electronic survey.

In addition, or alternatively, the additional communication can include a multiple choice type question where each response option indicates a particular electronic survey or type of electronic survey. For instance, the additional communication can provide system default electronic survey options: meeting feedback survey, customer feedback survey, employee feedback survey, etc. As another example, the response options can correspond to user-defined default surveys associated with the sender user. In order to select the option, the sender user can respond to the additional communication by indicating the particular survey or type of survey desired. For instance, the sender user can respond with a communication that includes a number associated with one of the response options. Alternatively, the response options may be hyperlinks within the additional communication, and based on the sender user selecting the hyperlink, the survey system receives an indication of the sender user's selection.

In other embodiments, the survey system 104 analyzes text included in the response, as shown in act 308 of FIG. 3A. For instance, a sender user may response with a list of 5 questions, with the questions numbered 1-5. Accordingly the survey system 104 can detect the list of questions, and use the text of the questions to create survey questions to include in an electronic survey. Furthermore, based on the analysis performed on the response from the sender user, the survey system can determine an electronic survey to provide to the other parties of the communication. For example, the survey system 104 can determine an electronic survey to provide to the other parties of the communication via any of the manners described above in regard to acts 204-212 of FIG. 2A.

In some embodiments, analyzing the response includes determining a meaning of the response. For example, and as explained above with respect to FIG. 2A, the survey system 104 can determine a meaning of a content of the response, as shown in act 310 of FIG. 3A. Furthermore, the survey system 104 can analyze user input included within the response via the NLP system to determine and derive meanings of the user input. For example, depending on the type of communication utilized to provide the response, the survey system 104 can analyze, via the NLP system, one or more of a subject line of an email, a body of an email, a body of a social networking communication, a body of a text message, etc. In some instances, as will be described in greater detail below in regard to FIG. 4, via the NLP system, the survey system 104 can determine content included in the response to include in an electronic survey. For example, the survey system 104 can determine that the content of the response indicates that the sender user wishes to receive feedback about an event related to a particular topic.

In addition to determining a meaning of the response, in some instances, the survey system 104 detects one or more keywords included within a user input associated with the response, as shown in act 210 of FIG. 2A. Furthermore, the survey system 104 can analyze any user input included within the response via the keyword detection system to determine and detect keywords included in the user input. As noted above in regard to act 210 of FIG. 2A, in one or more embodiments, the keywords and phrases can be defined by the survey system 104. For example, the keywords and/or phrases can be associated with particular electronic surveys that the survey system 104 can provide in response to the communication.

Furthermore, in one or more embodiments, and in response to receiving a communication from a sender user, the survey system 104 can send a communication to the sender user that includes an option to conduct a standard survey, or a customized option that allows the sender user to provide information to customize the survey. In addition, the communication from the survey system 104 to the sender user can include a paywall or similar payment processing option. In one or more embodiments, the standard survey is a benchmarked survey that allows the survey system 104 to provide benchmarked reports to the sender user based upon the responses received from the respondent users (e.g., comparing the results of the sender user's survey with results of other user's surveys that were the same survey). In this way, the sender user can have an idea of how the results of the electronic survey stack up against averages, means, highs, lows, etc.

Regardless of the particular response the sender user provides in response to the additional communication from the survey system 104, the survey system 104 generates a customized survey. For example, and as illustrated in FIG. 3A, the survey system 104 generates an electronic survey based on response information 313 included within the sender user's response to the additional communication. The customized electronic survey can then be stored within the survey system 104 database, formatted for the communication channel that corresponds to the communication type of the original sender user's communication, and distributed to the party or parties of the original sender user's communication.

Figure 3B:
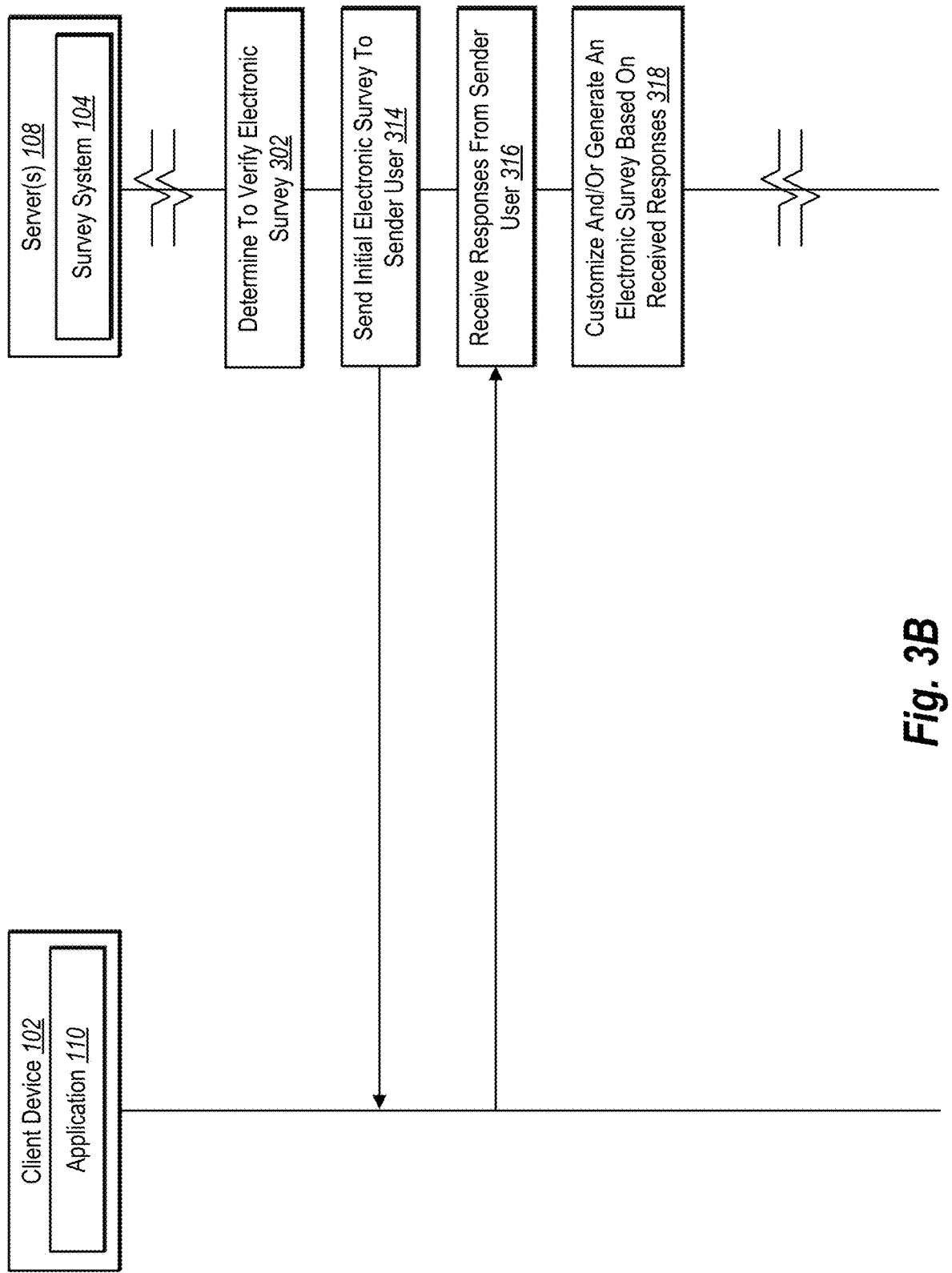
FIG. 3B illustrates a sequence-flow diagram of an electronic survey system distributing survey inquiries to a client device according to yet another embodiment of the present disclosure.

FIG. 3B illustrates a sequence-flow diagram showing various acts that the survey system 104 can utilize in determining an electronic survey to provide to the other parties of the communication and enabling a sender user to customize an electronic survey according to further embodiments of the present disclosure. As shown in act 302 of FIG. 3B, the survey system 104 determines to verify a determined electronic survey with the sender user. For example, to ensure the survey system 104 distributes an appropriate survey, the survey system 104 sends a verification request to the sender user that provides the sender user with a sample of the electronic survey. The determination to verify a survey can be based on a default setting (user or system), a sender user requesting the verification (e.g., including the word survey verification in the communication), a threshold confidence level that the survey system generated a correct survey (e.g., a determined level of complexity based on analyzing content of the communication), a sender user creating a customized survey option, and/or a combination of the above characteristics and factors.

As mentioned, in response to the survey system 104 determining to verify an electronic survey, the survey system 104 sends an initial electronic survey to the sender user, as shown in act 314 of FIG. 3B. For example, the survey system 104 sends an initial electronic survey to the sender user to request that the sender user verify that the sender user desires to proceed with administration of the survey. The survey system 104 can provide the initial survey within a communication, or allow the sender user to access the initial survey via a link.

In addition to requesting verification of the initial survey, the sender user can further customize options the sender user wants. For instance, the survey system can send an email with an electronic survey or hyperlink to an electronic survey (e.g., a hyperlink to an electronic survey within a web interface) that includes various questions, such as, but not limited to: 1) When should the survey be sent?; 2) What type of survey should be sent?; 3) Which attendees should get the survey (all, accepted, declined, etc.)?.

In response to providing the initial electronic survey to the client device 102 associated with the sender user, the survey system 104 can receive one or more responses from the client device 102, as shown in act 316 of FIG. 3B. For example, the response can include a confirmation that indicates the survey system 104 should proceed with the administration of the survey. Alternatively, the response can include an indication that the sender user wished to cancel the administration of the survey. In some examples, the survey system 104 can analyze the responses and customize and/or generate an electronic survey via any of the manners described above in regard to acts 204 and 212 of FIG. 2A. Accordingly, based on the received one or more responses, the survey system can customize and/or generate an electronic survey to provide to the other parties of the communication, as shown in act 318 of FIG. 3B.

The foregoing method of sending an electronic survey to the sender user can enable the sender user to use a common generic trigger email (e.g., feedback@system.com), while simultaneously allowing for very customized surveys and survey results. Moreover, by sending the sender user a follow up electronic survey in response to the survey system 104 receiving a communication from the user, the survey system 104 can authenticate and/or confirm that the sender user indeed wants to conduct an electronic survey. In this way, the survey system 104 can provide a sender user additional control over administration of the electronic survey even after the sender user sends the communication that includes the survey system ID.

Figure 4:
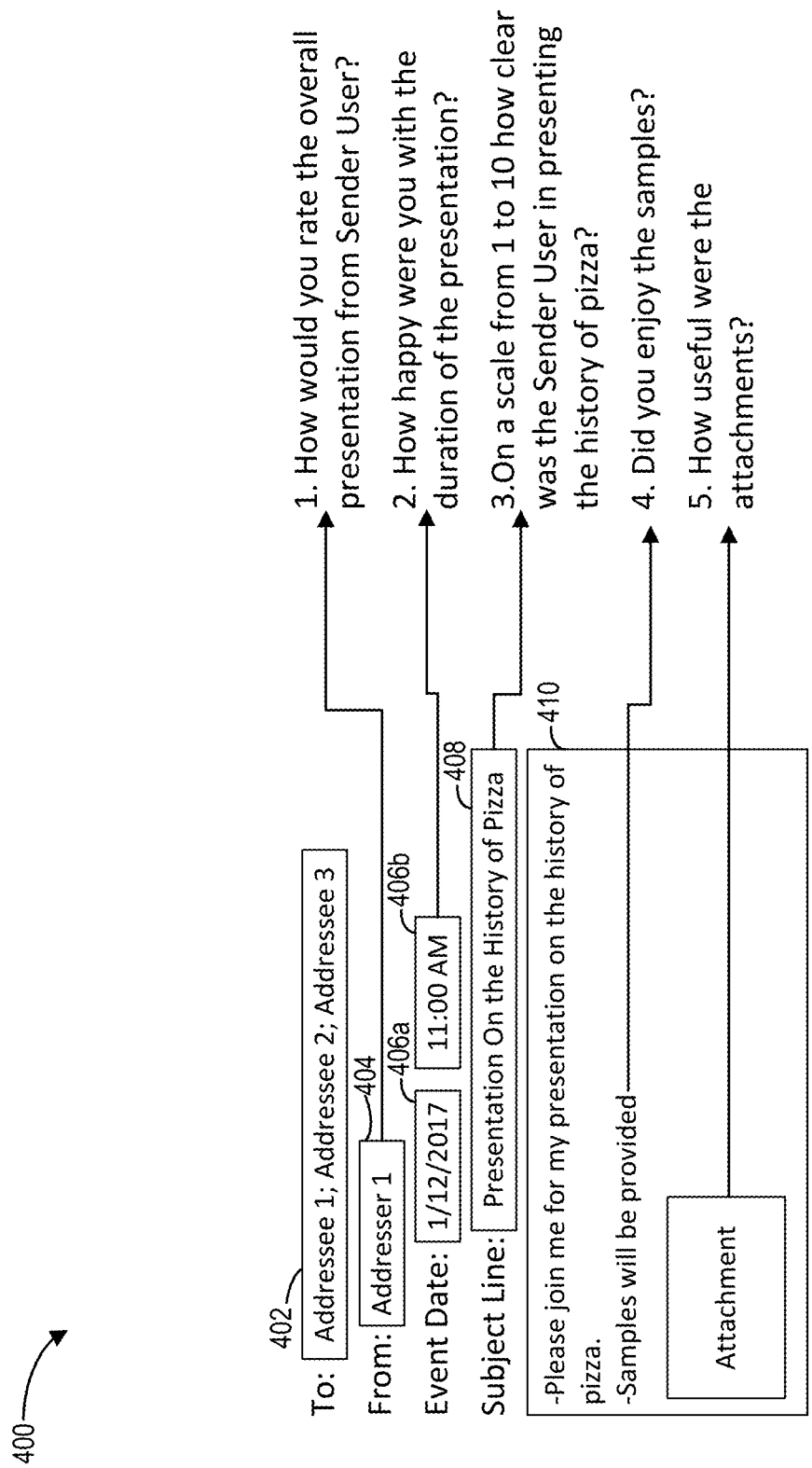
FIG. 4 illustrates a schematic diagram of analyzing content of an electronic communication to generate an electronic survey according to one or more embodiments of the present disclosure.

FIG. 4 illustrates a schematic diagram of an example communication and an example process through which the survey system 104 generates an electronic survey based on the communication received from the sender user. As a non-limiting example, the communication of FIG. 4 includes an event invitation 400. Additionally, the communication can include an address input area 402. As shown in FIG. 4, in some embodiments, a user can add a plurality of parties to the address input area 402. Furthermore, as discussed above, one the parties of the plurality parties include the survey system 104 (e.g., survey system ID). Moreover, the communication includes an indication of the sender user within a sender indicator area 404. Additionally, the communication includes event data within event information areas 406a, 406b. Likewise, the communication includes a subject line area 408. Also, the communication includes a body area 410 including content (e.g., text, attachments).

Upon receiving the example communication, the survey system 104 can analyze the communication via any of the manners described above in regard to acts 204-210 of FIG. 2A. Furthermore, based on the analysis, the survey system 104 can generate electronic survey questions to provide to the other parties of the communication. In particular, as shown, the survey system 104 can identify a sender user (e.g., sender user ID such as an email address) based on metadata (e.g., a header of an email) of the communication and can generate a question concerning the sender user (e.g., "How would you rate the overall presentation from [Sender User 1]?"). For instance, the survey system 104 can plug the sender user's information into a predefined survey question.

Additionally, based on the analysis, the survey system 104 can identify a date and time of the event indicated in the communication as indicated in the event date 406a and time 406b. For example, the survey system 104 can identify a date and time of the event indicated in the communication via any of the manners described above in regard to act 214 of FIG. 2B. Furthermore, based on the determined date and time of the event, the survey system 104 can generate a question concerning the date and time of the event (e.g., "Did you think the duration of the one hour presentation was too long or too short?"). For example, the survey system 104 can plug an event's duration, start time, end time, etc. into predefined survey questions.

Moreover, the survey system 104 can determine a subject of the communication and/or the event based on the metadata of the communication and/or body of the communication. For instance, and with reference to FIG. 4, the survey system 104 can detect the subject from within the subject line 408 of the event invitation 400. For example, the survey system 104 can determine a subject of the communication and/or event via any of the manners described above in regard to acts 204-210 of FIG. 2A. Furthermore, based on the determined subject of the communication and/or event, the survey system 104 can generate a question concerning the subject of the communication and/or event. For example, if the subject of a presentation is determined to be "Presentation on the History of Pizza," the survey system 104 can generate a question automatically that requests a response concerning the presentation. For example, and as shown in FIG. 4, the survey system 104 can generate a question "On a scale of 1 to 10, how clear was the sender user in presenting the history of pizza?"). For instance, the survey system 104 can plug a subject of the communication and/or event into predefined survey questions.

Furthermore, in some embodiments, the survey system 104 can determine whether of the communication includes any attachments (e.g., presentation materials, documents, videos, audio files). Additionally, based on whether the communication includes any attachments, the survey system 104 can generate a question concerning the attachments of the communication (e.g., "How useful were the attachments?"). For example, the survey system 104 can insert information related to the attachments (e.g., a title of an attachment) into predefined survey questions.

Additionally, as noted above, the survey system 104 can determine a meaning of content within the communication. For example, the survey system 104 can determine a meaning of content in any of the manners described above in regard to act 208 of FIG. 2A. Moreover, based on the determined meaning of the communication, the survey system 104 can generate a question concerning the determined meaning of the communication. For instance, and as indicated in FIG. 4, the survey system can generate the question "Did you enjoy the samples?". For example, the survey system 104 can compare a determined meaning of the communication to predefined survey questions within a survey database of the survey system 104 and can customize (e.g., adjust) a survey question to correlate to the determined meaning of the communication.

In additional embodiments, sender users can choose from one of several available survey system IDs of the survey system 104, and depending on which survey system ID the sender user includes as a recipient to the communication, the survey system 104 can provide different electronic surveys. In other words, a different survey system IDs can be associated with different predefined surveys. In one or more embodiments, the survey system IDs indicate the type of survey with which the sender user ID is associated. For instance, with respect to email address survey IDs, the survey ID of meetingfeedback@surveys.com is associated with a meeting feedback survey that includes questions for obtaining feedback related to a meeting, while the survey ID of managerfeedback@surveys.com is associated with a manager feedback survey that includes questions for obtaining feedback related to a manager.

For example, in some embodiments, receiving a communication at a first address associated with the survey system 104 can cause the survey system 104 to provide a first electronic survey having a first set of questions to the other parties of the communication. Additionally, receiving a communication at a second address associated with the survey system 104 can cause the survey system 104 to provide a second different electronic survey having a second set of electronic surveys to the other parties of the communication. As additional examples, receiving communications at different addresses associated with the survey system 104 can cause the survey system 104 to provide an electronic survey related to at least one of a presenter's performance, an event's content, an event's timing, a sender user's leadership, etc. Similar to the other foregoing examples, the survey system 104 does not require the sender users to create an account or login with the survey system 104.

Furthermore, in some embodiments, a sender user can add additional parties to a communication (e.g., an event) after sending an original communication to the survey system 104. For instance, in one or more embodiments, the survey system 104 can receive a subsequent communication from a sender user relating to a previously received communication from the sender user with the subsequent communication having additional parties. In response to receiving the subsequent communication, the survey system 104 can analyze the subsequent communication in any of the manners described above in regard to act 204 of FIG. 2A to determine whether a previously received communication relates to the subsequent communication. For example, the survey system 104 can analyze a subsequent communication related to an event to determine whether the survey system 104 previously received a communication related to the same event.

Similarly, the survey system 104 can detect that a party from the original communication is no longer a party to a subsequent communication, and in response, remove that party from the recipient list of the survey. In some embodiments, the survey system 104 can receive a notification that a party declined a meeting invite, and based on the decline notification, the survey system 104 removes that party from the recipient list.

If the survey system 104 determines that the subsequent communication relates to a previously received communication such that a same electronic survey should be provided to parties of the subsequent communication as the parties of the previously received communication, the survey system 104 can determine to provide the electronic survey to new parties of the subsequent communication. In particular, the survey system 104 can determine whether the electronic survey has already been provided to other parties of the subsequent communication. If the survey system 104 determines that one or more of the other parties of the subsequent communication have not been provided with the electronic survey, the survey system 104 can provide the one or more of the other parties with the electronic survey via any of the manners described above in regard to act 216 of FIG. 2B.

Figure 5:
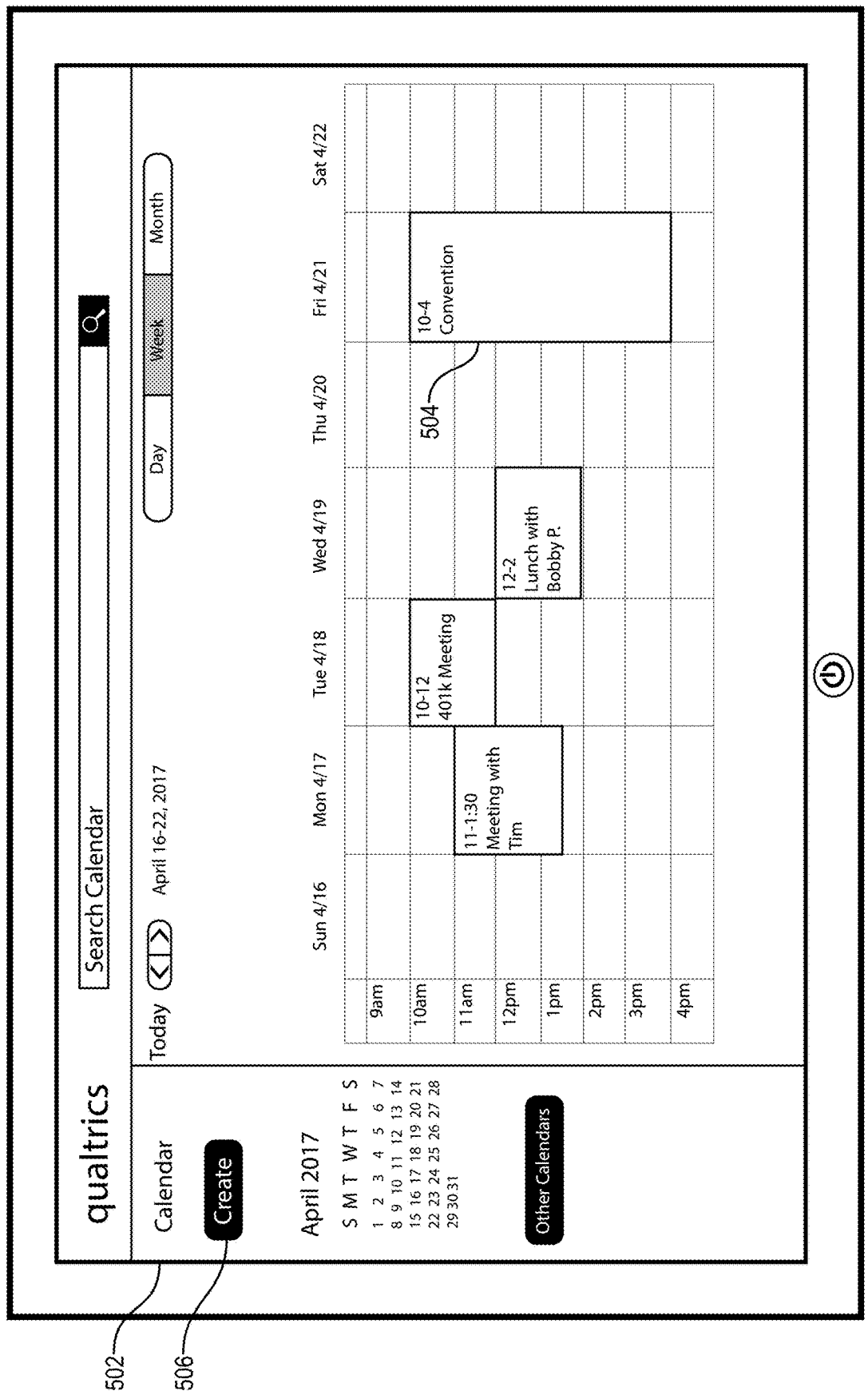
FIG. 5 illustrates an example a graphical user interface to create an electronic communication that includes survey system identifier according to one or more embodiments of the present disclosure.

FIGS. 5-15 show various schematic representations of graphical user interfaces for a process of sending a communication to a survey system, having the survey system administer a survey, and receiving results of an administered survey. In particular, FIG. 5 illustrates a communication platform (e.g., an email platform) graphical user interface 502 ("GUI") showing a plurality of scheduled events 504 where a user (e.g., a sender user) can add invitees. For example, the communication platform GUI can include a selectable element 506 for creating an event.

Figure 6:
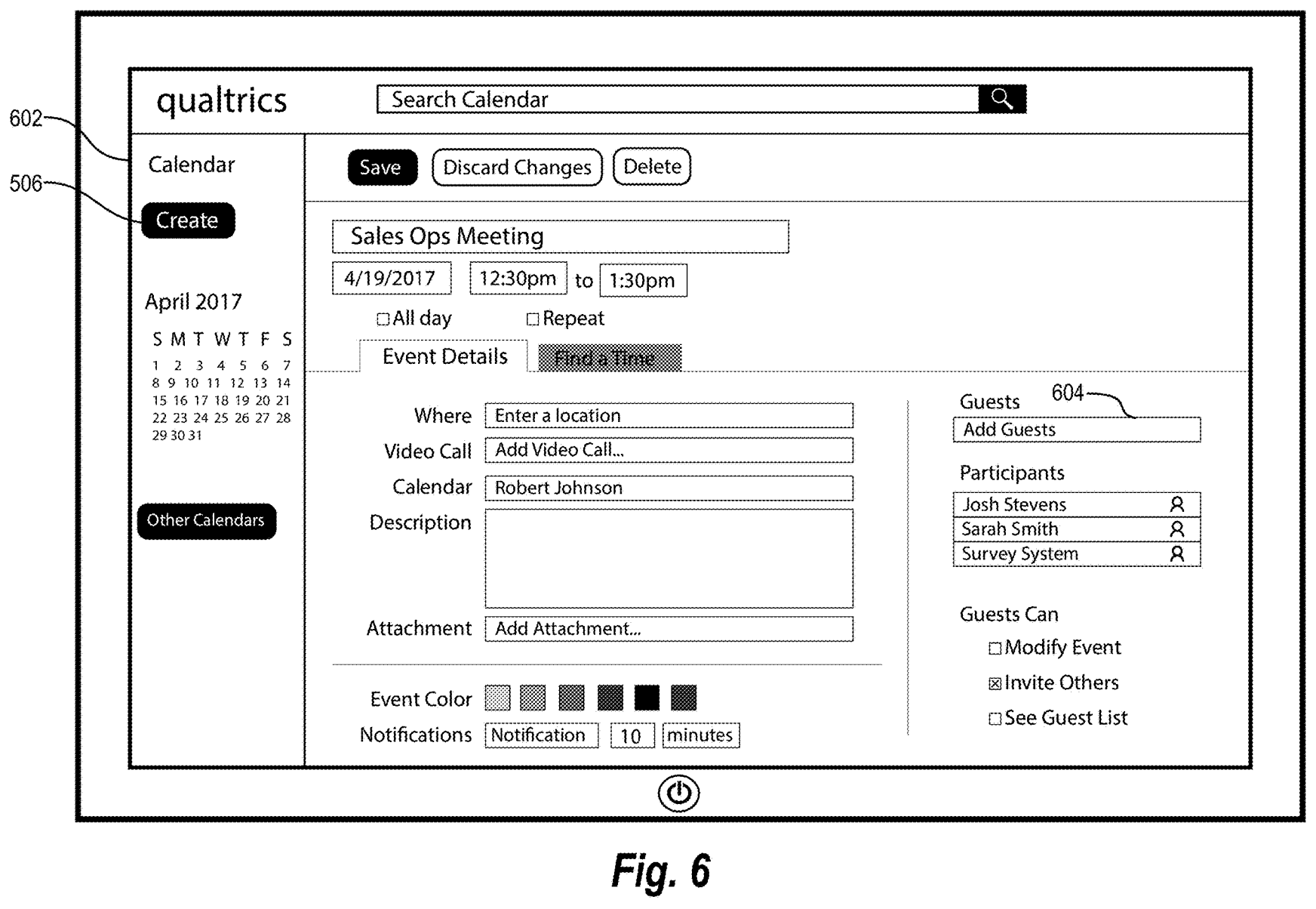
Figure 7:
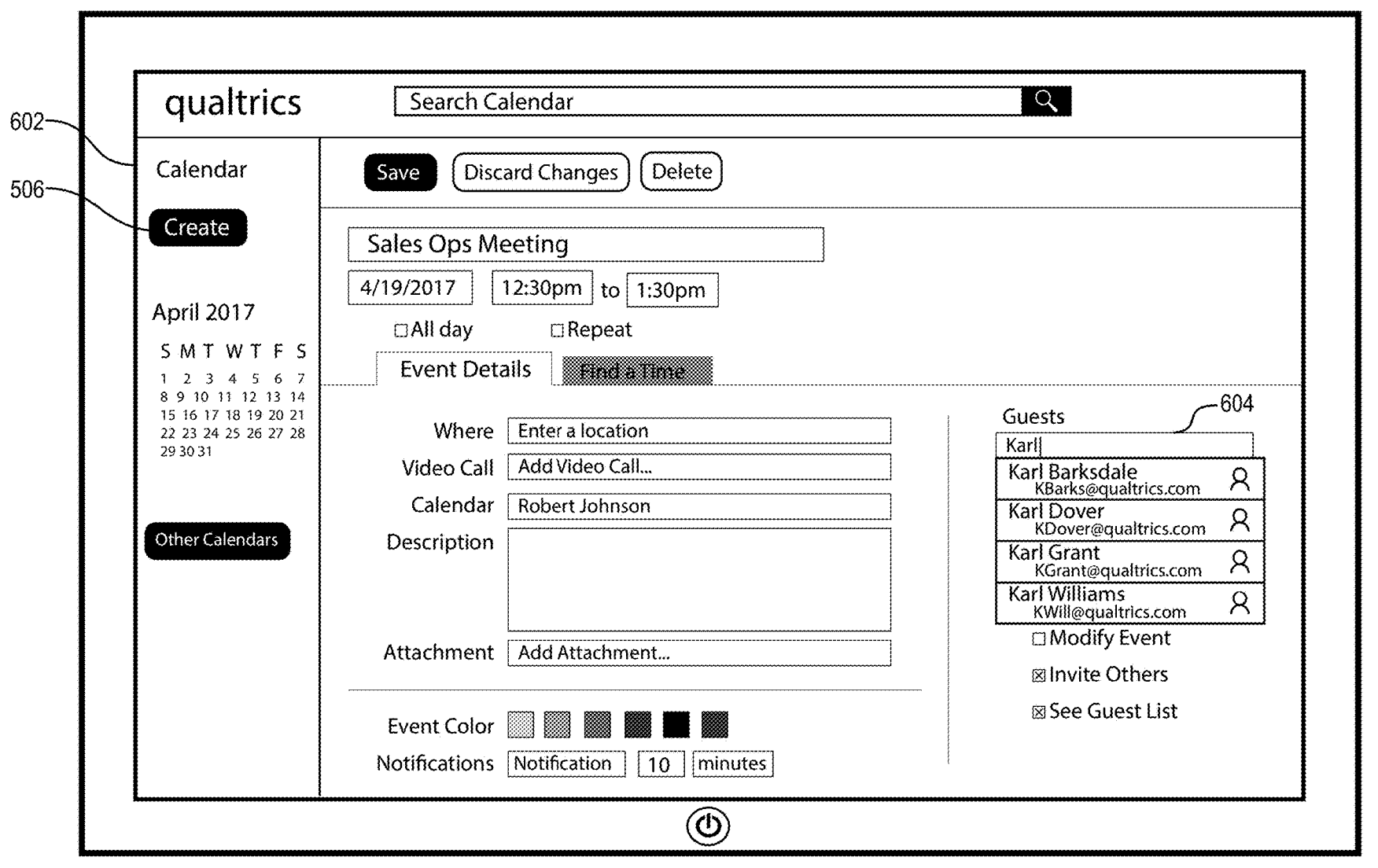
Figure 8:
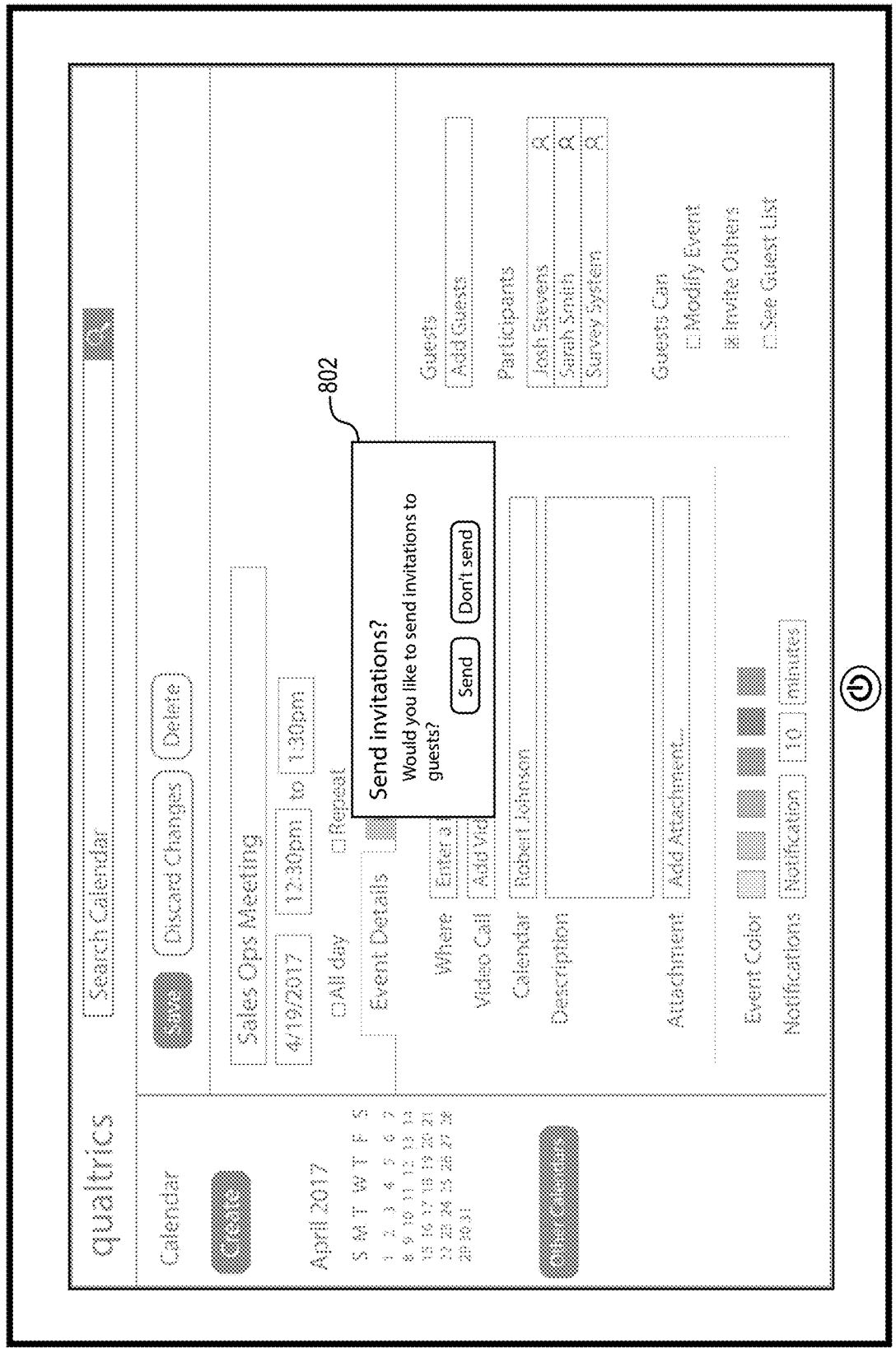
FIG. 8 illustrates a confirmation graphical user interface according to one or more embodiments of the present disclosure.

FIGS. 6-7 illustrate an event management GUI 602 showing a particular event where a user (e.g., a sender user) can add invitees to the particular event. The event management GUI 602 can show an input field 604 where sender user can add invitees to the particular event. As noted above, a user can add the survey system 104 as an invitee to the particular event. FIG. 8 illustrates a confirmation GUI 802 for confirming to send invitations to the invitees added to the event management GUI.

Figure 9:
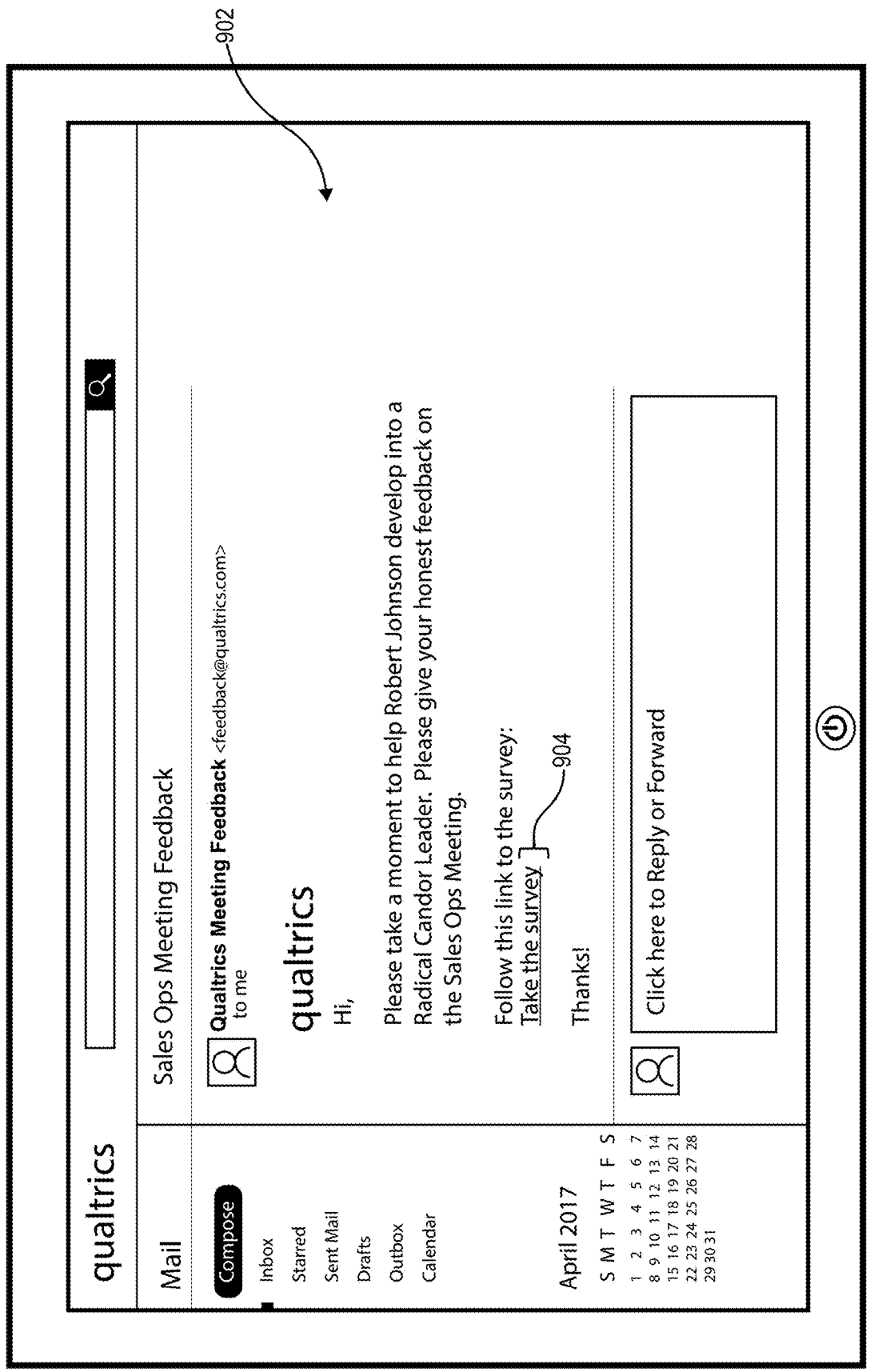
FIG. 9 illustrates an example survey communication a survey system can provide to parties of an electronic communication from a sender user according to one or more embodiments of the present disclosure.

FIG. 9 illustrates an example survey communication 902 (e.g., email) that the survey system 104 can provide to other invitees (e.g., parties) of the event in response to being invited to the event. As shown, the survey communication includes an invitation to complete an electronic survey in relation to the event. Furthermore, the survey communication includes a selectable element 904 (i.e., a hyperlink) to a webpage where the invitee can respond to the electronic survey.

FIG. 10 illustrates an example electronic survey 1002 that the survey system 104 provides to an invitee (e.g., other addressee) of the event upon the invitee selecting the hyperlink to respond to the electronic survey. In particular, the survey system 104 can provide the electronic survey within a web interface. As shown, the electronic survey 1002 can concern the event to which the survey system 104 was invited (e.g., the meeting).

Figure 11:
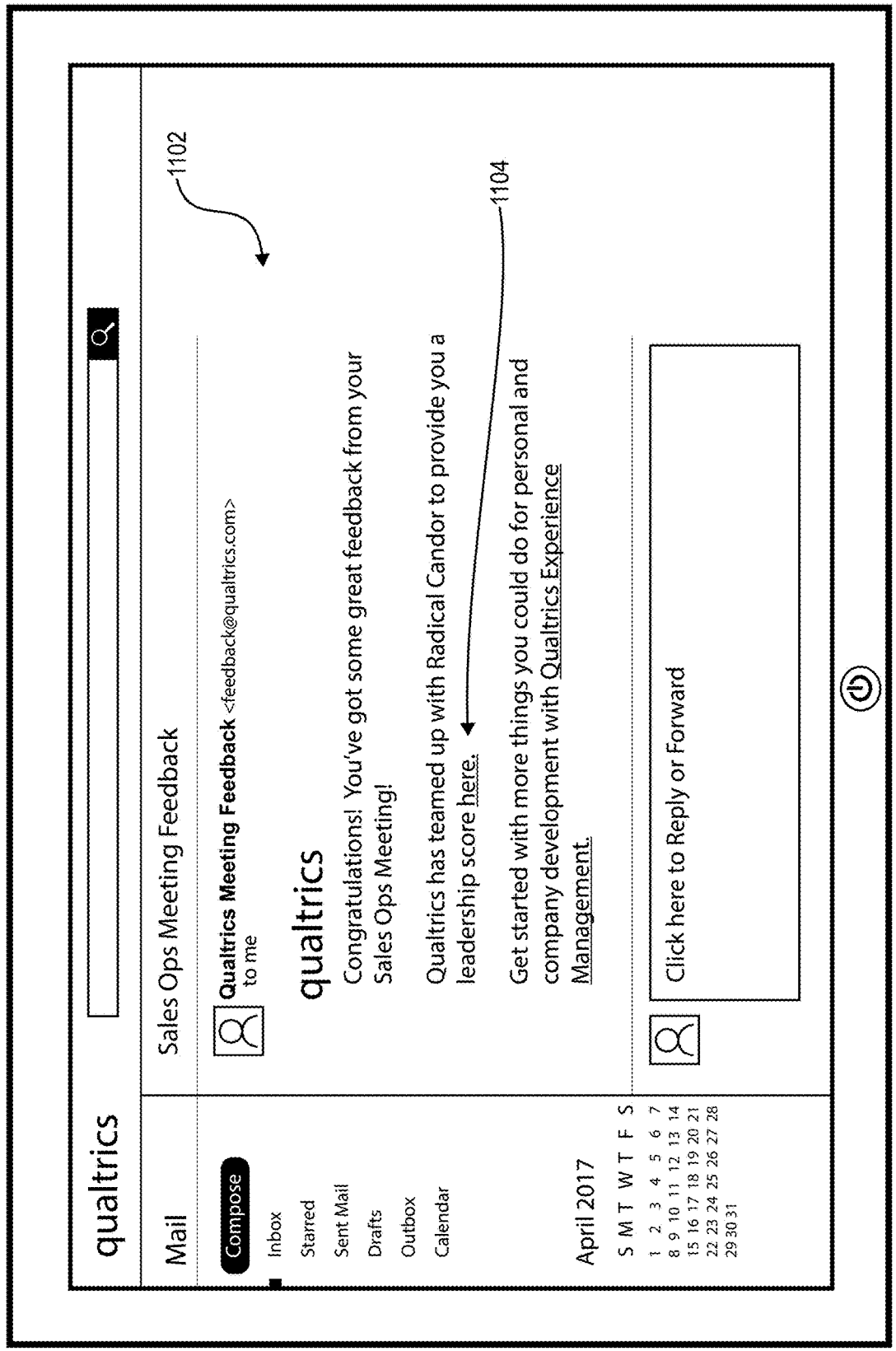
FIG. 11 illustrates an example reporting communication that a survey system can provide to the sender user of an electronic communication according to one or more embodiments of the present disclosure.

FIG. 11 illustrates an example results communication 1102 that the survey system 104 can provide to the sender user upon generating results of the electronic survey (e.g., results generated according to the manners described above in regard to act 220 of FIG. 220). As shown in FIG. 11, the communication can include a selectable element 1104 (e.g., a hyperlink) to a webpage displaying a report.

FIGS. 12-15 illustrate portions of a report including the results of the electronic survey. As shown, the report can include various graphical elements for clearly and dynamically displaying the results. For example, as parties to the communication respond, the survey system can update the results of the survey and provide the updated results to the sender user. In addition, as the sender user causes the survey system to administer additional surveys (e.g., surveys of the same type), the survey system can generate a report showing results over time. This is possible because the survey system can keep track of results based on the sender ID associated with the sender user. Accordingly, in at least one embodiment, the sender user benefits from combined results over multiple different surveys without ever having to create an account with the survey system.

Figure 12:
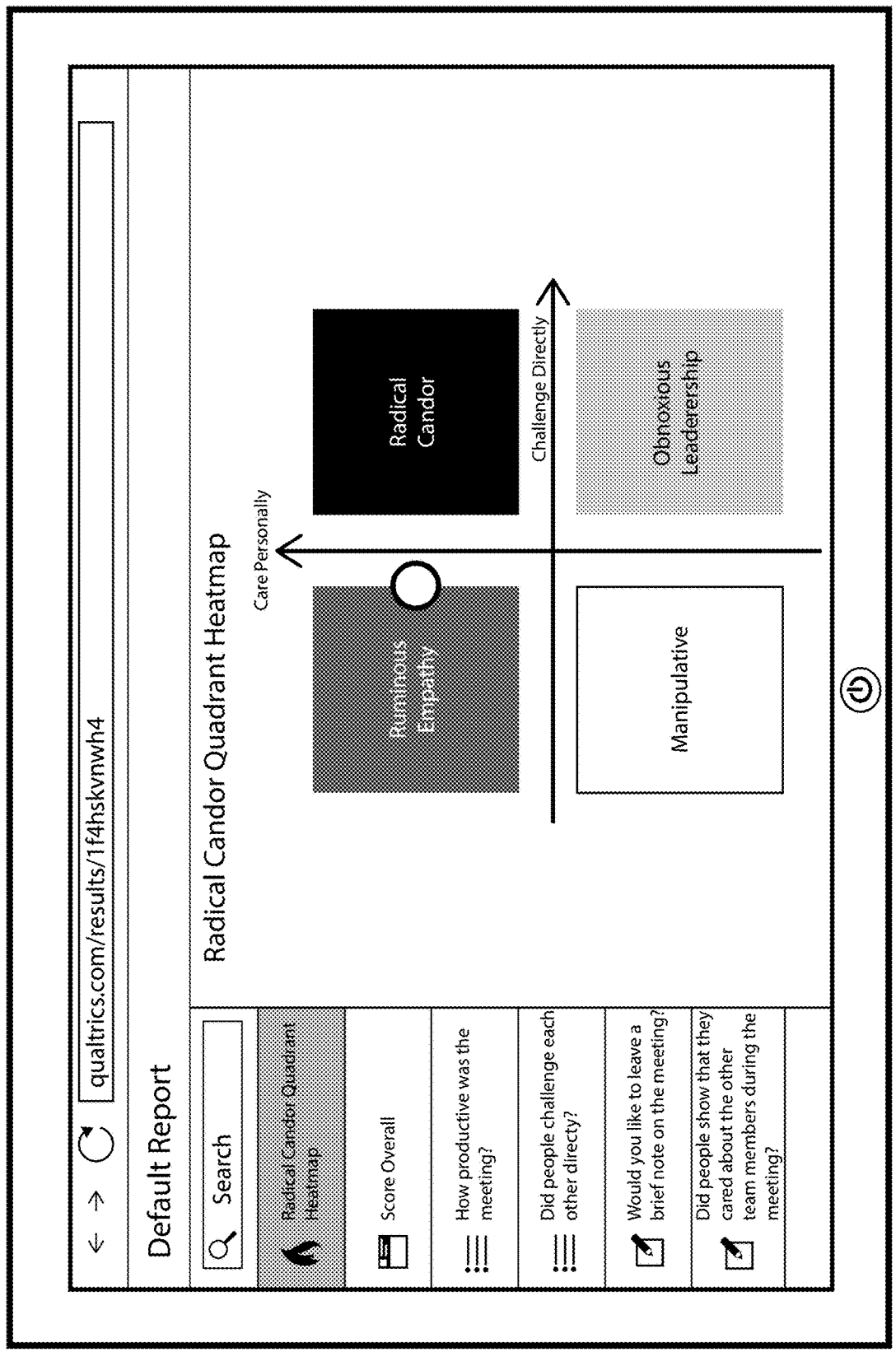
FIGS. 12-15 illustrate example graphical elements representing results of an electronic survey that a survey system can provide to a sender user of an electronic communication according to one or more embodiments of the present disclosure.
Figure 13:
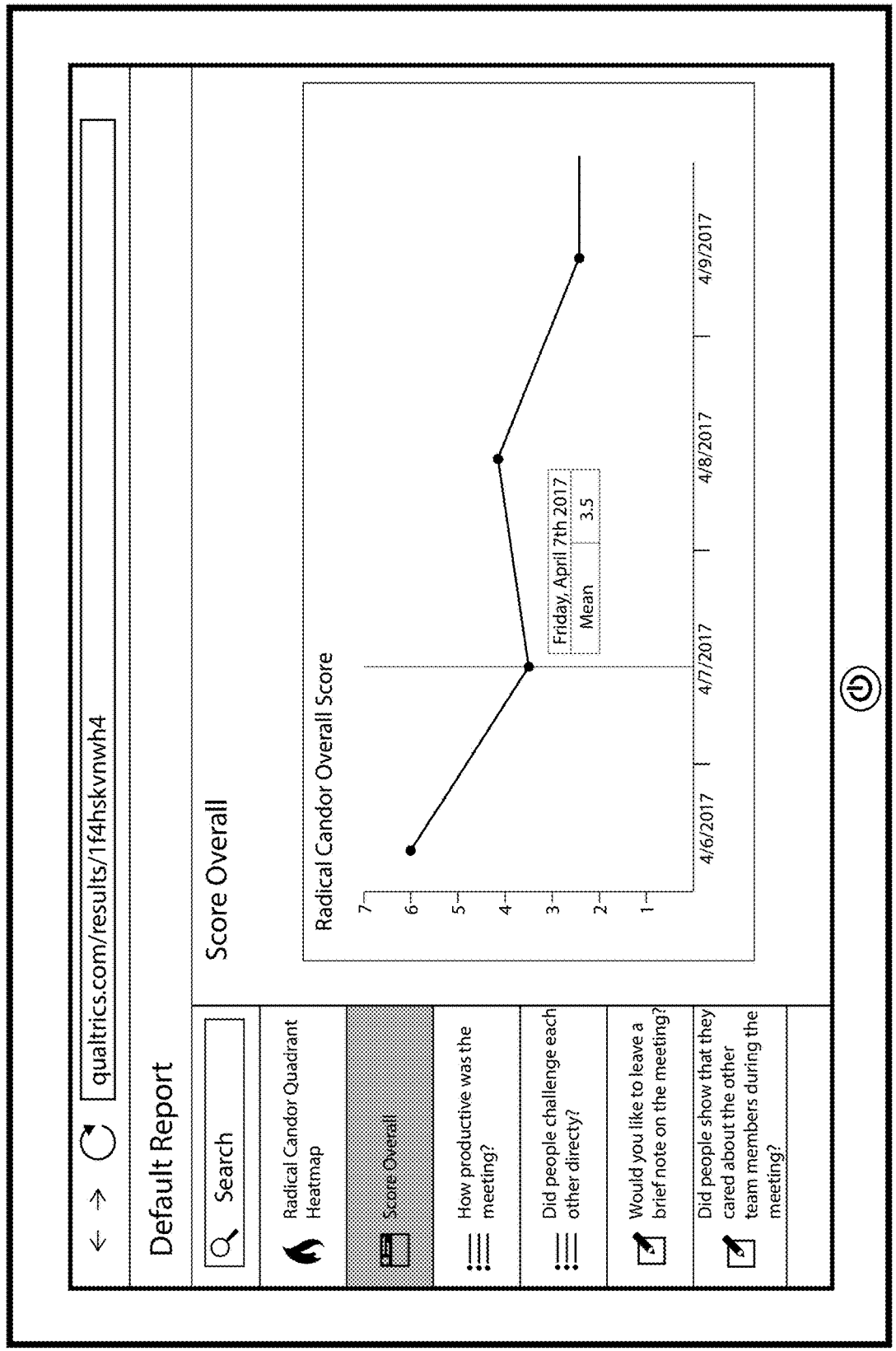
Figure 14:
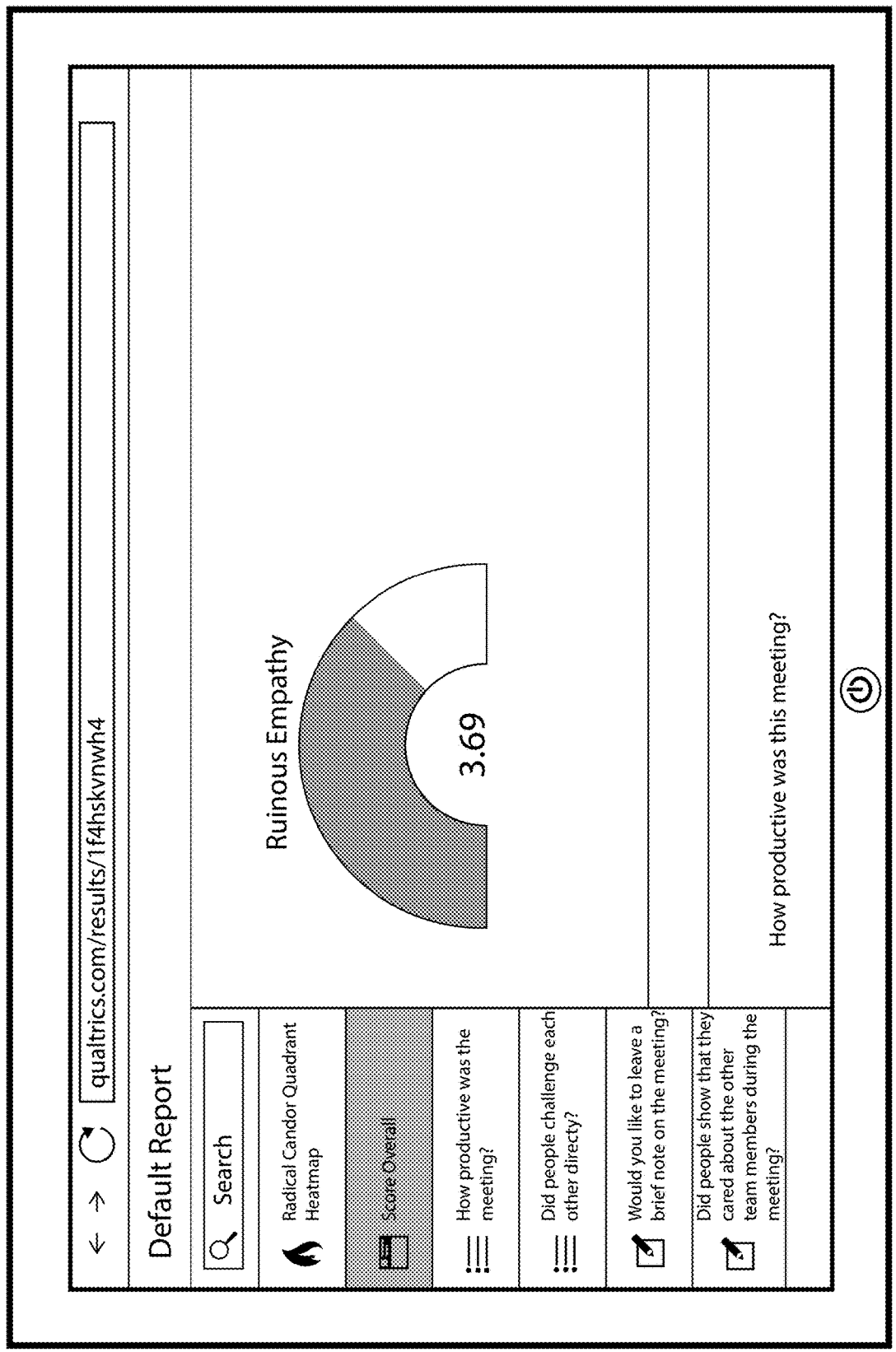
Figure 15:

As further shown in FIGS. 12-15, the survey system can provide results in various formats. FIG. 12 illustrates heat map result report that calculates and displays a current overall score, or a score of a particular survey, based on the quality of feedback a manager gives to employees. FIG. 13 illustrates an overall score for a manager over time. For example, FIG. 13 indicates that the manager is decreasing in quality over time. FIG. 14 illustrates a particular metric determined from the survey question of "How productive was this meeting?" FIG. 15 illustrates a report that shows a bar graph that includes the number of specific responses provided to the question of "How productive was this meeting?"

Figure 16:
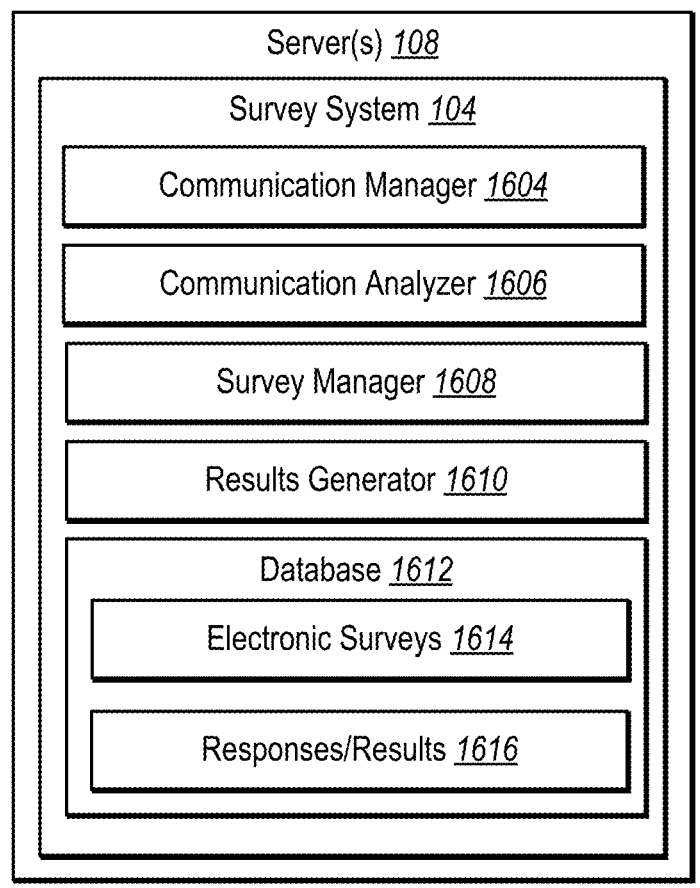
FIG. 16 illustrates a schematic representation of a survey system according to one or more embodiments of the present disclosure.

FIG. 16 illustrates a schematic diagram of a survey system 104 hosted on server(s) 108 in accordance with one or more embodiments. The survey system 104 can be an example embodiment of the survey system 104 described in connection with the survey system of FIGS. 1-15. The survey system 104 can include various components for performing the processes and features described herein. For example, and as illustrated in FIG. 16, the survey system 104 includes a communication manager 1604, a communication analyzer 1606, a survey manager 1608, a results generator 1610, and a database 1612. In addition, the survey system 104 can include additional components not illustrated, such as those as described below. The various components of the survey system 104 can be in communication with each other using any suitable communication protocols, such as described with respect to FIG. 20 below.

Each component of the survey system 104 can be implemented using one or more computing devices (e.g., server devices 108) including at least one processor executing instructions that cause the survey system 104 to perform the processes described herein. The components of the survey system 104 can be implemented by a single server device or across multiple server devices, as described above. Although a particular number of components are shown in FIG. 16, the survey system 104 can include more components or can combine the components into fewer components (such as a single component), as can be desirable for a particular implementation.

As mentioned, the survey system 104 includes a communication manager 1604. The communication manager can receive communications from sender users, provide additional communications to the sender users, and provide electronic surveys to other parties of the communications from the sender users. For example, the communication manager 1604 can receive and provide communication, electronic surveys, and responses in any of the manners described above in regard to acts 202, 216, 218, 222, 304, and 306 of FIGS. 2A-3.

As also discussed above, the survey system 104 further includes a communication analyzer 1606. The communication analyzer 1606 can analyze communications and responses received from sender users. For instance, the communication analyzer 1606 can analyze communications and response via any of the manners described above in regard to acts 204-210 and 308-312 of FIGS. 2A-3.

Additionally, as noted above, the survey system 104 includes a survey manager 1608. In one or more embodiments, the survey manager 1608 can identify electronic surveys to provide to other parties of the communication based on the analysis performed on the communication received from the sender user and/or response received from the sender user. For example, the survey manager 1608 can query the database 1612 to identify electronic surveys to provide to other parties of the communication. In one or more embodiments, the survey manager 1608 can access predefined surveys, can customize predefined surveys, can create new surveys, verify surveys, modify surveys, add survey questions, delete survey questions, create survey questions, create a recipient list, determine a survey schedule, and or determine, identify, and generate data related to administering an electronic survey. For instance, the survey manager 1608 can create an electronic survey via any of the manners described above in regard to FIGS. 2A and 4.

Furthermore, as discussed above, the survey system 104 includes a results generator 1610. The results generator 1610 can generate results and reports based on the responses received from the other parties of the communication. In particular, the results generator 1610 can generate and provide results according to any of the manners described above in regard to act FIG. 2B and FIGS. 11-15.

As mentioned above, the survey system 104 includes a survey database 1612. The survey database 1612 can include a single database or multiple databases. In addition, the survey database 1612 can be located within the survey system 104 (e.g., hosted by server(s) 108). Alternatively, the survey database 1612 can be external to the survey system 104, such as in cloud storage. Further, the survey database 1612 can store and provide data and information to the survey system 104, as described above in regard to FIGS. 2A through FIG. 4.

The survey database 1612 can include electronic surveys 1614, such as electronic surveys 1614 of the survey system 104. Moreover, the survey database 1612 can include results 1616 generated from responses received by the survey system 104 from the other parties of the communication. In addition, the survey database 1612 can store information about each electronic survey 1614, such as parameters and preferences that correspond to each electronic survey 1614.

Each electronic survey 1614 can have a survey identifier number (or simply "survey ID number") to provide unique identification. In some cases, the electronic surveys 1614 can be organized according to survey ID number. Alternatively, electronic surveys 1614 in the survey database 1612 can be organized according to other criteria, such as creation date, last modified date, closing time, most recent results, sender ID, etc. Further, the survey database 1612 can associate access codes with a survey ID number, such that the survey system 104 can identify to which electronic survey a response corresponds when the response includes an access code.

Furthermore, the electronic surveys 1614 of the survey database 1612 can include survey questions. More specifically, each electronic survey 1614 can include a set of potential survey questions. The survey system 104 can store the survey questions grouped by electronic survey. Further, each survey question can have a unique question identifier number (or simply "question ID number"). In some cases, the question ID number can also identify the electronic survey 1614 to which the survey question belongs. For example, all survey questions from a particular electronic survey 1614 can include the survey ID number combined with the question ID number.

As further shown in FIG. 16, the database 1612 can include responses/results 1616 associated with electronic surveys. The responses/results can be organized based on a given survey, based on sender user ID, based on a type of survey (e.g., to allow for benchmarking) as well as other organizational formats. In addition, the responses can include a response ID that can be associated with a particular question ID and/or survey ID. Accordingly, using the survey ID, question ID, and response ID, the survey system can maintain and associate information for a given survey within the survey database for use by the survey system 104.

Figure 17:
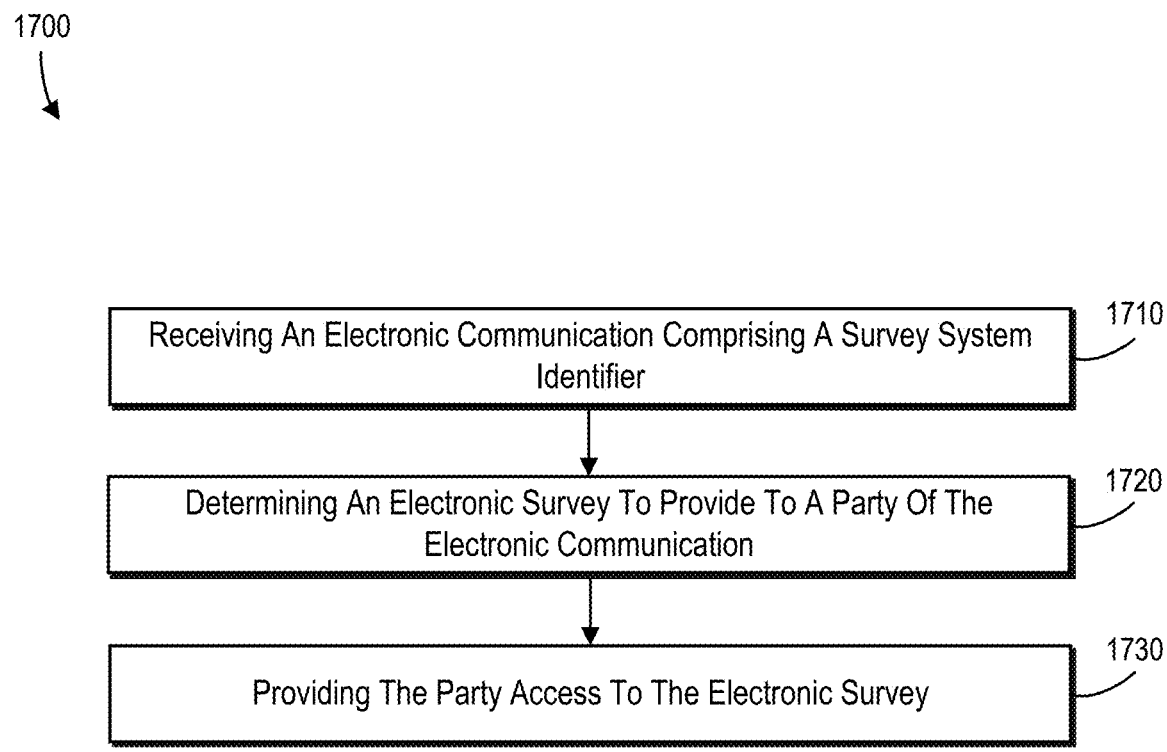
FIG. 17 illustrates a method a survey system can utilize to create and distribute an electronic survey according to one or more embodiments of the present disclosure.

FIG. 17 illustrates a flowchart of one example method 1700 of providing an electronic survey to parties of a communication. As shown in FIG. 17, the method 1700 can involve an act 1710 of receiving a communication comprising a survey system identifier. For example, act 1710 can include receiving, from a client device associated with a sender user, an electronic communication based on the electronic communication comprising a survey system identifier, the electronic communication further comprising a party identifier corresponding to a party of the electronic communication. In some instances, act 1710 can further includes receiving an email invite to an event having the survey system as an invitee. In additional instances, act 1710 can include receiving a social networking invite to an event having the survey system as an invitee. Additionally, act 1710 can include any of the actions described above in regard to act 202 of FIG. 2A.

Additionally, the method 1700 involves an act 1720 of determining an electronic survey to provide to an additional party of the electronic communication. For example, act 1720 can include determining an electronic survey to provide to other parties of the plurality of parties of the communication. In some instances, act 1720 can include in response to receiving the electronic communication, determining an electronic survey to provide to the party of the electronic communication. Furthermore, in some embodiments, the communication includes an invite to an event, and wherein identifying an electronic survey related to a content of the communication includes identifying an electronic survey related to a type of the event.

In further embodiments, act 1720 can include sending an additional communication to a sender user of the communication having at least one question about the electronic survey to provide to the other parties of the communication, receiving a response from the sender user, and, based on the received response from the sender user, identifying the electronic survey to provide to the other parties of the plurality of parties. In yet further embodiments, act 1720 can include generating the electronic survey based on a content of the communication. Moreover, generating the electronic survey based on a content of the communication can include analyzing the communication to determine one or more of a meaning of and keywords included in the communication, and generating at least one survey question of the electronic survey based on the determined meaning of and keywords included in the communication. Moreover, act 1720 can include any of the actions described above in regard to act 212 of FIG. 2A and/or act 302 of FIG. 3.

Method 1700 can also involve an act 1730 of providing the party access to the electronic survey. For example, act 1730 can include providing the party access to the electronic survey by utilizing the party identifier corresponding to the party. Moreover, act 1730 can include any of the actions described above in regard to act 216 of FIG. 2B.

Furthermore, in one or more embodiments, method 1700 can involve receiving one or more responses from the other parties of the plurality of parties, generating results representing the one or more responses, and providing the results to a sender user of the communication. Furthermore, in some embodiments, method 1700 can include analyzing the communication to determine one or more of a meaning of and keywords included in the communication and determining the electronic survey to provide to the other parties of the plurality of parties based on the determined meaning of and keywords included in the communication.

The method 1700 can further include the following acts. For instance, method 1700 can include determining an electronic survey to provide to the party of the electronic communication comprises identifying a predefined electronic survey associated with one or more of a sender user identifier, the survey system identifier, or content within the electronic communication. In addition, providing the party access to the electronic survey utilizing the party identifier can include sending, to a client device associated with the party, a survey invitation communication comprising a link to a website that comprises the electronic survey. In addition, the electronic communication and the survey invitation communication may be a same type of communication that utilize a same communication platform. For example, the communication platform is an email communication platform, the survey system ID is an email address associated with a survey system, and the party ID is an email address associated with the party. Moreover, the method 1700 can include identifying a sender user identifier within the electronic communication, and where generating the survey result communication comprises including the sender user identifier within a recipient field of the survey result communication.

In addition, method 1700 can include receiving, from the client device associated with the party, a response based on input from the party corresponding to an electronic survey question of the electronic survey, generating a survey result communication based on the response, and providing the survey result communication to the client device associated with the sender user of the communication.

Furthermore, method 1700 can include analyzing the electronic communication to determine information indicating a distribution schedule for the electronic survey, and providing the party access to the electronic survey based on the distribution schedule for the electronic survey. In some embodiments, the electronic communication comprises an invitation for the party to an event, where the event is associated with a start time and an end time. Thus, the information indicating the distribution schedule for the electronic survey can include the end time of the event.

Furthermore, method 1700 can include analyzing the communication to detect a keyword or key phrase within the electronic communication, and determining at least one electronic survey question of the electronic survey based on the keyword or key phrase.

Figure 18:
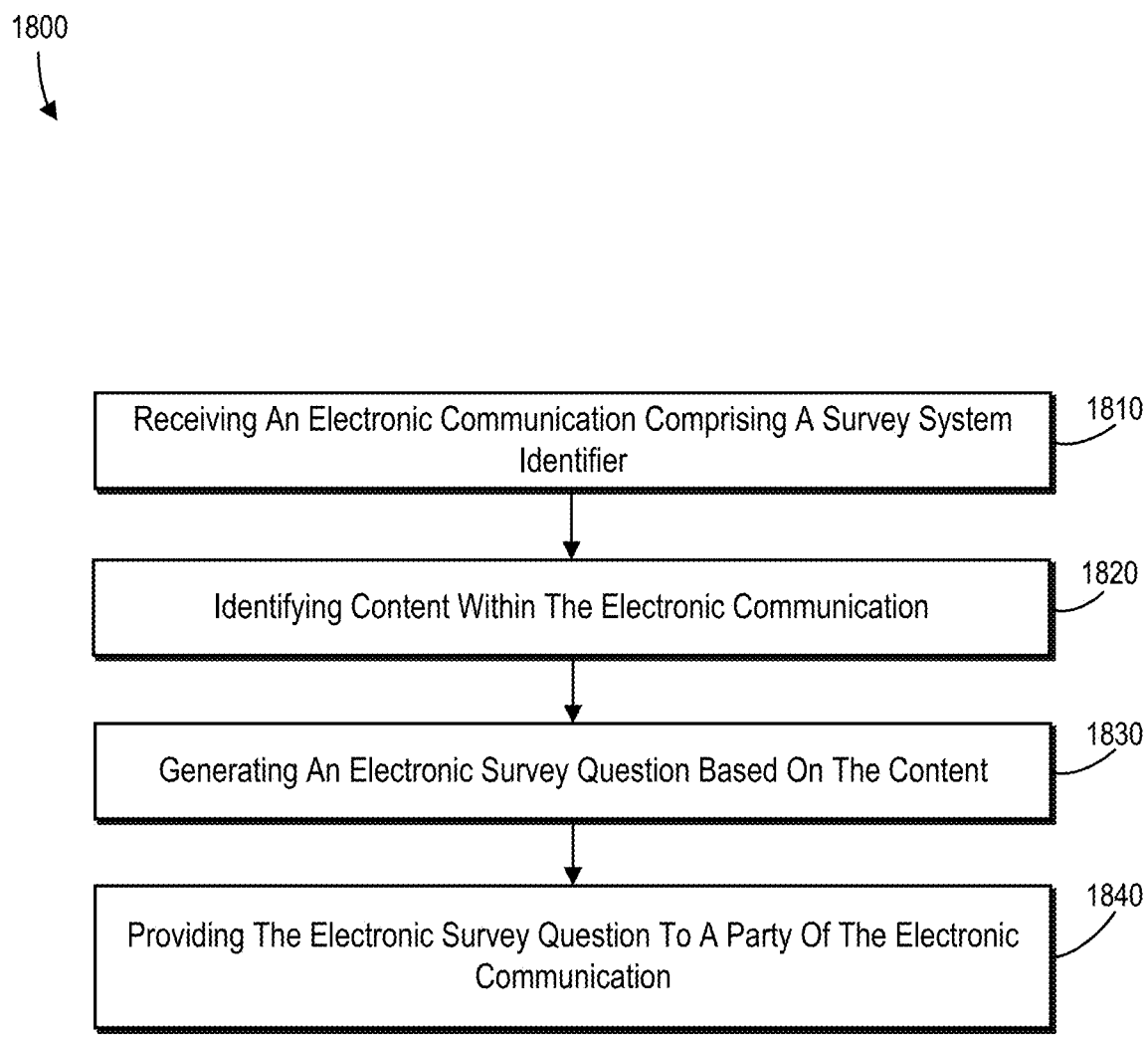
FIG. 18 illustrates a method a survey system can utilize to create and distribute an electronic survey according to one or more embodiments of the present disclosure.

FIG. 18 illustrates a flowchart of one example method 1800 of generating and providing an electronic survey to parties of a communication. As shown in FIG. 18, the method 1800 can involve an act 1810 of receiving an electronic communication comprising a survey system identifier. For example, act 1810 can include receiving, from a client device associated with a sender user, an electronic communication based on the electronic communication comprising a survey system identifier, the electronic communication further comprising a party identifier corresponding to an additional party of the electronic communication. In some instances, act 1810 can further include comprises receiving an email invite to an event having the survey system as an invitee. In additional instances, act 1810 can include receiving a social networking invite to an event having the survey system as an invitee. Additionally, act 1810 can include any of the actions described above in regard to act 202 of FIG. 2A.

Additionally, the method 1800 involves an act 1820 of identifying content within the electronic communication. For example, act 1820 can include analyzing the electronic communication to identify content of the electronic communication. Additionally, act 1820 can include any of the actions described above in regard to acts 204-211 of FIG. 2A and the methods and examples of FIG. 4.

Furthermore, the method 1800 can involves and act 1830 of generating an electronic survey question based on the content. For example, act 1830 can include based at least in part on the content of the electronic communication, generating one or more electronic survey questions. Act 1830 can include using any of the communication content described above to generate a survey question using the various methods and systems described above. In some instances, act 1840 can include identifying an electronic survey related to a content of the communication. Furthermore, in some embodiments, the communication includes an invite to an event, and wherein identifying an electronic survey related to a content of the communication includes identifying an electronic survey related to a type of the event.

In further embodiments, act 1830 can include sending an additional communication to a sender user of the communication having at least one question about the electronic survey to provide to the other parties of the communication, receiving a response from the sender user, and, based on the received response from the sender user, identifying the electronic survey to provide to the other parties of the plurality of parties. In yet further embodiments, act 1830 can include generating the electronic survey based on a content of the communication. Moreover, generating the electronic survey based on a content of the communication can include analyzing the communication to determine one or more of a meaning of and keywords included in the communication, and generating at least one survey question of the electronic survey based on the determined meaning of and keywords included in the communication. Moreover, act 1830 can include any of the actions described above in regard to act 216 of FIG. 2B.

Additionally, the method 1800 involves an act 1840 of providing the electronic survey question to a party of the electronic communication. For example, act 1840 can include, providing the one or more electronic survey questions to a client device associated with the additional party of the electronic communication. Act 184 can include any of the acts related to act 216 of FIG. 2A as well as any related disclosure.

Furthermore, in one or more embodiments, method 1800 can involve receiving one or more responses from the other parties of the plurality of parties, generating results representing the one or more responses, and providing the results to a sender user of the communication. Furthermore, in some embodiments, method 1800 can include analyzing the communication to determine one or more of a meaning of and keywords included in the communication and determining the electronic survey to provide to the other parties of the plurality of parties based on the determined meaning of and keywords included in the communication.

Method 1800 can further include analyzing the content of the electronic communication to identify a name for the sender user, generating one or more electronic survey questions comprises creating an electronic survey question related to the sender user. In addition, method 1800 analyzing the content of the electronic communication to identify a topic, and generating the one or more electronic survey questions by creating an electronic survey question related to the topic. In some example, the topic relates to an event type, and the one or more electronic survey questions includes requests for feedback with respect to the event type.

Moreover, method 1800 can include generating a survey ID within a survey database in response to receiving the electronic communication. Also, method 1800 can include assigning a question ID to each electronic survey question of the one or more electronic survey questions, and associating the question ID for each electronic survey question of the one or more electronic survey questions to the survey ID within the survey database. As such, the method 1800 can further include receiving from the client device associated with the party, a response to the one or more electronic survey questions, wherein the response includes the survey ID and a given question ID for a given electronic survey question of the one or more electronic survey questions, and associating the response with the electronic survey within the survey database based on detecting the survey ID the given question ID.

Embodiments of the present disclosure can comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein can be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions can be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure can be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure can also be practiced in distributed system environments where local and remote computer systems, which are linked (either by hardwired data links, wireless data links, or by a combination of hardwired and wireless data links) through a network, both perform tasks. In a distributed system environment, program modules can be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 19:
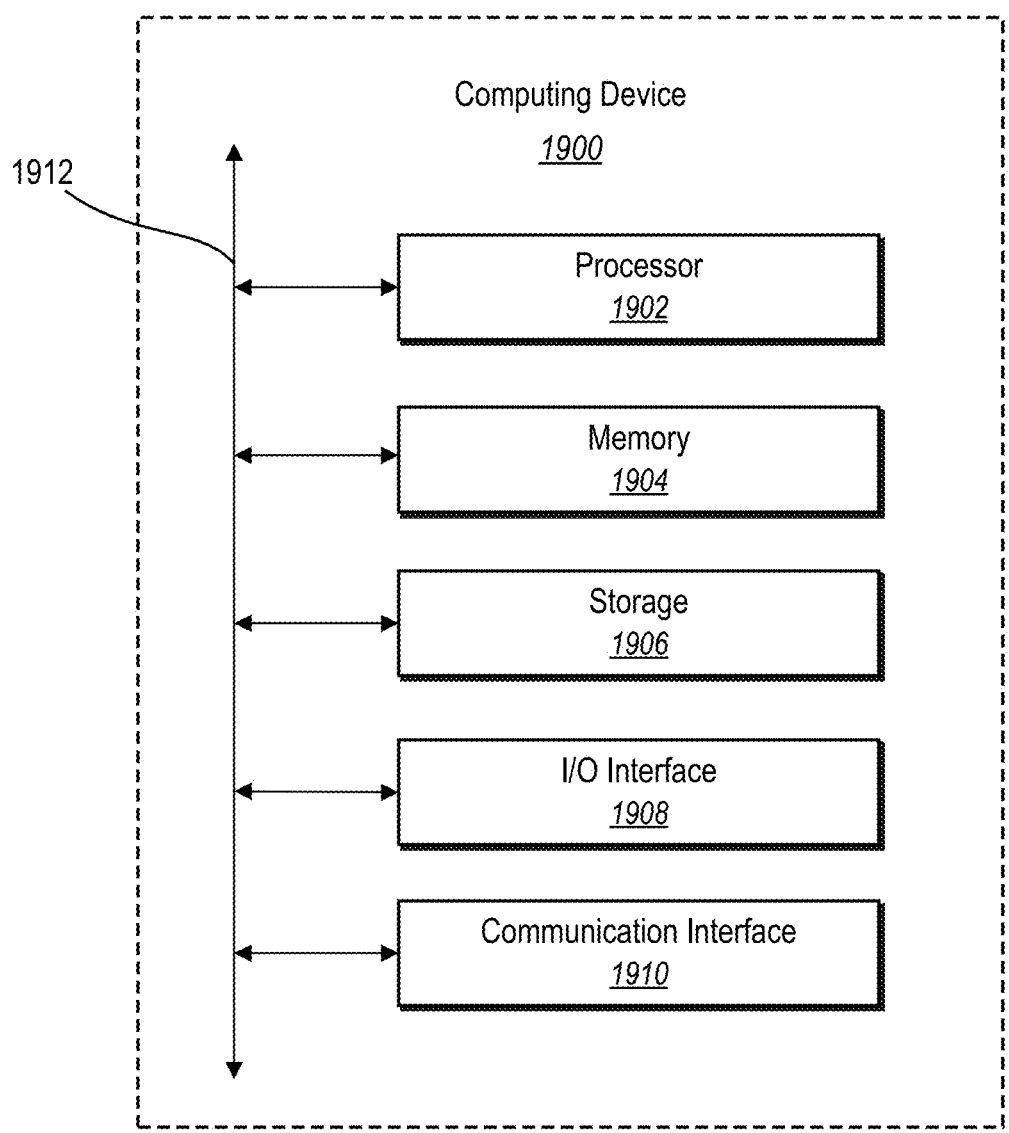
FIG. 19 illustrates a block diagram of an example computing device in accordance with one or more embodiments.

FIG. 19 illustrates a block diagram of an example computing device 1900 that can be configured to perform one or more of the processes described above. One will appreciate that one or more computing devices such as the computing device 1900 can implement the survey system 104, client device 102, and/or survey system 104 described above. As shown by FIG. 19, the computing device 1900 can comprise a processor 1902, a memory 1904, a storage device 1906, an I/O interface 1908, and a communication interface 1910, which can be communicatively coupled by way of a communication infrastructure 1912. While an example computing device 1900 is shown in FIG. 19, the components illustrated in FIG. 19 are not intended to be limiting. Additional or alternative components can be used in other embodiments. Furthermore, in certain embodiments, the computing device 1900 can include fewer components than those shown in FIG. 19. Components of the computing device 1900 shown in FIG. 19 will now be described in additional detail.

In one or more embodiments, the processor 1902 includes hardware for executing instructions, such as those making up a computer program. As an example, and not by way of limitation, to execute instructions, the processor 1902 can retrieve (or fetch) the instructions from an internal register, an internal cache, the memory 1904, or the storage device 1906 and decode and execute them. In one or more embodiments, the processor 1902 can include one or more internal caches for data, instructions, or parties. As an example and not by way of limitation, the processor 1902 can include one or more instruction caches, one or more data caches, and one or more translation look aside buffers (TLBs). Instructions in the instruction caches can be copies of instructions in the memory 1904 or the storage 1906.

The memory 1904 can be used for storing data, metadata, and programs for execution by the processor(s). The memory 1904 can include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1904 can be internal or distributed memory.

The storage device 1906 includes storage for storing data or instructions. As an example and not by way of limitation, storage device 1906 can comprise a non-transitory storage medium described above. The storage device 1906 can include a hard disk drive (HDD), a floppy disk drive, flash memory, an optical disc, a magneto-optical disc, magnetic tape, or a Universal Serial Bus (USB) drive or a combination of two or more of these. The storage device 1906 can include removable or non-removable (or fixed) media, where appropriate. The storage device 1906 can be internal or external to the computing device 1900. In one or more embodiments, the storage device 1906 is non-volatile, solid-state memory. In other embodiments, the storage device 1906 includes read-only memory (ROM). Where appropriate, this ROM can be mask programmed ROM, programmable ROM (PROM), erasable PROM (EPROM), electrically erasable PROM (EEPROM), electrically alterable ROM (EAROM), or flash memory or a combination of two or more of these.

The I/O interface 1908 allows a user to provide input to, receive output from, and otherwise transfer data to and receive data from computing device 1900. The I/O interface 1908 can include a mouse, a keypad or a keyboard, a touch screen, a camera, an optical scanner, network interface, modem, other known I/O devices or a combination of such I/O interfaces. The I/O interface 1908 can include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1908 is configured to provide graphical data to a display for presentation to a user. The graphical data can be representative of one or more graphical user interfaces and/or any other graphical content as can serve a particular implementation.

The communication interface 1910 can include hardware, software, or both. In any event, the communication interface 1910 can provide one or more interfaces for communication (such as, for example, packet-based communication) between the computing device 1900 and one or more other computing devices or networks. As an example and not by way of limitation, the communication interface 1910 can include a network interface controller (NIC) or network adapter for communicating with an Ethernet or other wire-based network or a wireless NIC (WNIC) or wireless adapter for communicating with a wireless network, such as a WI-FI.

Additionally, or alternatively, the communication interface 1910 can facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks can be wired or wireless. As an example, the communication interface 1910 can facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 1910 can facilitate communications various communication protocols. Examples of communication protocols that can be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1912 can include hardware, software, or both that couples components of the computing device 1900 to each other. As an example and not by way of limitation, the communication infrastructure 1912 can include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 20:
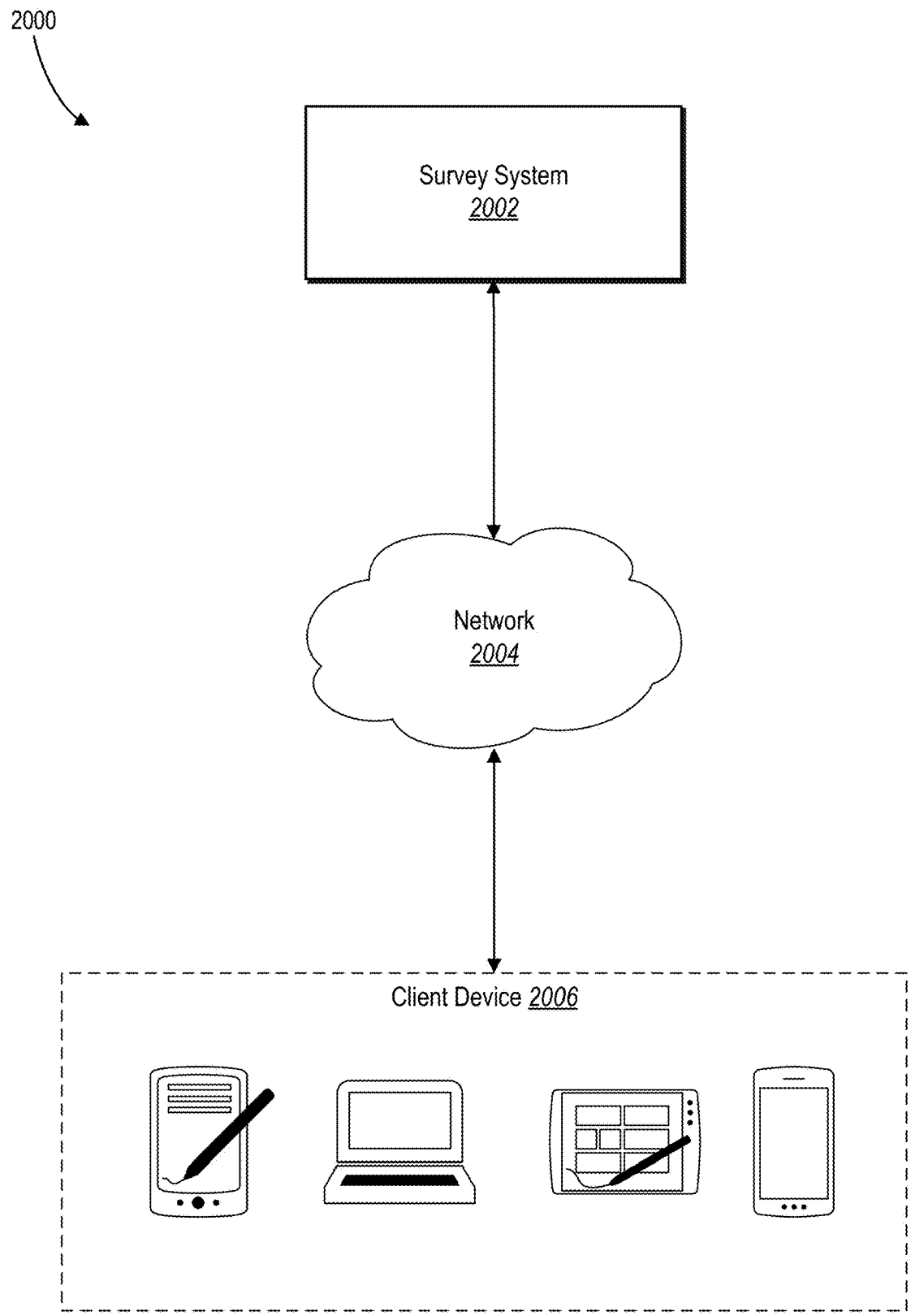
FIG. 20 is an example network environment of a survey system in accordance with one or more embodiments.

FIG. 20 illustrates an example network environment 2000 of a survey system 2002. Network environment 2000 includes a client system 2006, and a survey system 2002 connected to each other by a network 2004. Although FIG. 20 illustrates a particular arrangement of client system 2006, survey system 2002, and network 2004, this disclosure contemplates any suitable arrangement of client system 2006, survey system 2002, and network 2004. As an example and not by way of limitation, two or more of client system 2006, and survey system 2002 can be connected to each other directly, bypassing network 2004. As another example, two or more of client system 2006 and survey system 2002 can be physically or logically co-located with each other in whole, or in part. Moreover, although FIG. 20 illustrates a particular number of client systems 2006, survey systems 2002, and networks 2004, this disclosure contemplates any suitable number of client systems 2006, survey systems 2002, and networks 2004. As an example and not by way of limitation, network environment 2000 can include multiple client system 2006, survey systems 2002, and networks 2004.

This disclosure contemplates any suitable network 2004. As an example and not by way of limitation, one or more portions of network 2004 can include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 2004 can include one or more networks 2004.

Links can connect client system 2006, and survey system 2002 to communication network 2004 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 2000. One or more first links can differ in one or more respects from one or more second links.

In particular embodiments, client system 2006 can be an electronic device including hardware, software, or embedded logic components or a combination of two or more such components and capable of carrying out the appropriate functionalities implemented or supported by client system 2006. As an example and not by way of limitation, a client system 2006 can include any of the computing devices discussed above in relation to FIG. 5. A client system 2006 can enable a network user at client system 2006 to access network 2004. A client system 2006 can enable its user to communicate with other users at other client systems 2006.

In particular embodiments, client system 2006 can include a web browser, such as MICROSOFT INTERNET EXPLORER, GOOGLE CHROME, or MOZILLA FIREFOX, and can have one or more add-ons, plug-ins, or other extensions, such as TOOLBAR or YAHOO TOOLBAR. A user at client system 2006 can enter a Uniform Resource Locator (URL) or other address directing the web browser to a particular server (such as server, or a server associated with a third-party system), and the web browser can generate a Hyper Text Transfer Protocol (HTTP) request and communicate the HTTP request to server. The server can accept the HTTP request and communicate to client system 2006 one or more Hyper Text Markup Language (HTML) files responsive to the HTTP request. Client system 2006 can render a webpage based on the HTML files from the server for presentation to the user. This disclosure contemplates any suitable webpage files. As an example and not by way of limitation, webpages can render from HTML files, Extensible Hyper Text Markup Language (XHTML) files, or Extensible Markup Language (XML) files, according to particular needs. Such pages can also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser can use to render the webpage) and vice versa, where appropriate.

In particular embodiments, survey system 2002 can include a variety of servers, sub-systems, programs, modules, logs, and data stores. In particular embodiments, survey system 2002 can include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Survey system 2002 can also include suitable components such as network interfaces, security mechanisms, load balancers, failover servers, management-and-network-operations consoles, other suitable components, or any suitable combination thereof.

In particular embodiments, survey system 2002 can include one or more user-profile stores for storing user profiles. A user profile can include, for example, biographic information, demographic information, behavioral information, social information, or other types of descriptive information, such as work experience, educational history, hobbies or preferences, interests, affinities, or location. Interest information can include interests related to one or more categories. Categories can be general or specific. Additionally, a user profile can include financial and billing information of users (e.g., users 116, customers, etc.).

The foregoing specification is described with reference to specific example embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments can be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this invention. Indeed, various modifications of the present disclosure, in addition to those shown and described herein, such as alternative useful combinations of the elements described, can become apparent to those skilled in the art from the description. Such modifications and embodiments are also intended to fall within the scope of the appended claims and legal equivalents.

What is claimed is:

1. A method comprising:
   receiving, at a survey system and from a client device associated with a sender user, an electronic communication addressed to a recipient party identifier corresponding to a recipient party of the electronic communication, wherein the electronic communication corresponds to an event invitation for an event and comprises a survey system identifier corresponding to the survey system; and in response to receiving the electronic communication at the survey system:
  automatically determining an electronic survey to provide to the recipient party of the electronic communication; and
  automatically providing the recipient party access to the electronic survey via a recipient client device by transmitting an additional electronic communication addressed to the recipient party identifier upon completion of a time associated with the event, wherein the electronic survey comprises one or more electronic survey questions corresponding to the event.

2. The method of claim 1, wherein the additional electronic communication comprises a survey invitation communication comprising a link to a website that comprises the electronic survey.

3. The method of claim 2, wherein the electronic communication and the survey invitation communication are a same type of communication that utilize a same communication platform.

4. The method of claim 3, wherein the communication platform is an email communication platform, the survey system identifier is an email address associated with the survey system, and the recipient party identifier is an email address associated with the recipient party.

5. The method of claim 1, further comprising:
  receiving, from the recipient client device, a response based on one or more inputs from the recipient party corresponding to the one or more electronic survey questions of the electronic survey;
  generating a survey result communication based on the response; and
  providing the survey result communication to the client device associated with the sender user of the electronic communication.

6. The method of claim 5, further comprising:
  identifying a sender user identifier within the electronic communication; and
  wherein generating the survey result communication comprises including the sender user identifier within a recipient field of the survey result communication.

7. The method of claim 1, wherein determining the electronic survey to provide to the recipient party of the electronic communication comprises identifying a pre-defined electronic survey associated with one or more of a sender user identifier, the survey system identifier, or content within the electronic communication.

8. The method of claim 1, further comprising:
  analyzing the electronic communication to determine information indicating a distribution schedule for the electronic survey; and
  wherein providing the recipient party access to the electronic survey via the recipient client device is based on the distribution schedule for the electronic survey.

9. The method of claim 8, wherein:
  the event comprises a meeting, the meeting associated with a start time and an end time; and
  the information indicating the distribution schedule for the electronic survey comprises the end time of the meeting.

10. The method of claim 1, further comprising:
  analyzing the electronic communication to detect a keyword or key phrase within the electronic communication; and
  determining at least one electronic survey question of the electronic survey based on the keyword or key phrase.

11. A method comprising:
receiving, at a survey system and from a client device associated with a sender user, an electronic communication addressed to a recipient party identifier corresponding to a recipient party of the electronic communication, wherein the electronic communication corresponds to an event invitation for an event and comprises a survey system identifier corresponding to the survey system; and
in response to receiving the electronic communication at the survey system:
  analyzing the electronic communication to identify content of the electronic communication;
  based at least in part on the content of the electronic communication, automatically generating one or more electronic survey questions corresponding to the event; and
  automatically providing, to a recipient client device associated with the recipient party by transmitting an additional electronic communication addressed to the recipient party, the one or more electronic survey questions upon completion of a time associated with the event.

12. The method of claim 11, further comprising:
analyzing the content of the electronic communication to identify a name for the sender user; and
wherein generating the one or more electronic survey questions comprises creating an electronic survey question related to the sender user.

13. The method of claim 11, further comprising:
analyzing the content of the electronic communication to identify a topic; and
wherein generating the one or more electronic survey questions comprises creating an electronic survey question related to the topic.

14. The method of claim 13, wherein:
the topic relates to an event type of the event; and
the one or more electronic survey questions comprise requests for feedback with respect to the event type.

15. The method of claim 11, further comprising generating a survey ID within a survey database in response to receiving the electronic communication.

16. The method of claim 15, further comprising:
assigning a question ID to each electronic survey question of the one or more electronic survey questions; and
associating the question ID for each electronic survey question of the one or more electronic survey questions to the survey ID within the survey database.

17. The method of claim 16, further comprising:
receiving from the recipient client device, a response to the one or more electronic survey questions, wherein the response includes the survey ID and a given question ID for a given electronic survey question of the one or more electronic survey questions; and
associating the response with the electronic survey within the survey database based on detecting the survey ID the given question ID.

18. A system comprising:
at least one processor; and
at least one non-transitory computer readable storage medium storing instructions thereon that, when executed by the at least one processor, cause the system to:
receive, at a survey system and from a client device associated with a sender user, an electronic communication addressed to a recipient party identifier corresponding to a recipient party of the electronic communication, wherein the electronic communication corresponds to an event invitation for an event and comprises a survey system identifier corresponding to the survey system; and in response to receiving the electronic communication at the survey system:
  automatically determine an electronic survey to provide to the recipient party of the electronic communication; and
  automatically provide the recipient party access to the electronic survey via a recipient client device by transmitting an additional electronic communication addressed to the recipient party identifier upon completion of a time associated with the event, wherein the electronic survey comprises one or more electronic survey questions corresponding to the event.

19. The system of claim 18, further comprising instructions that, when executed by the at least one processor, cause the system to:

receive, from the recipient client device, a response based on one or more inputs from the recipient party corresponding to the one or more electronic survey questions of the electronic survey;

generate a survey result communication based on the response; and provide the survey result communication to the client device associated with the sender user of the electronic communication.

20. The system of claim 19, further comprising instructions that, when executed by the at least one processor, cause the system to:

identify a sender user identifier within the electronic communication; and wherein generating the survey result communication comprises including the sender user identifier within a recipient field of the survey result communication.

* * * * *